United States Patent
Schumacher et al.

(10) Patent No.: US 8,728,226 B2
(45) Date of Patent: *May 20, 2014

(54) HIGH-GLOSS MULTILAYER EFFECT PIGMENTS HAVING A CHROMATIC INTERFERENCE COLOR AND A NARROW SIZE DISTRIBUTION, AND METHOD FOR THE PRODUCTION THEREOF

(75) Inventors: Dirk Schumacher, Pegnitz (DE); Michael Grüner, Auerbach (DE); Günter Kaupp, Neuhaus (DE)

(73) Assignee: Eckart GmbH (DE)

( * ) Notice: Subject to any disclaimer, the term of this patent is extended or adjusted under 35 U.S.C. 154(b) by 44 days.

This patent is subject to a terminal disclaimer.

(21) Appl. No.: 13/143,378

(22) PCT Filed: Aug. 9, 2010

(86) PCT No.: PCT/EP2010/004865
§ 371 (c)(1),
(2), (4) Date: Jul. 14, 2011

(87) PCT Pub. No.: WO2011/020570
PCT Pub. Date: Feb. 24, 2011

(65) Prior Publication Data
US 2011/0265689 A1 Nov. 3, 2011

(30) Foreign Application Priority Data
Aug. 19, 2009 (DE) .......................... 10 2009 037 934

(51) Int. Cl.
*C09C 1/00* (2006.01)

(52) U.S. Cl.
USPC ......... 106/415; 106/157.8; 106/404; 106/417

(58) Field of Classification Search
None
See application file for complete search history.

(56) References Cited

U.S. PATENT DOCUMENTS

| 4,128,435 A | 12/1978 | Bäumer et al. |
| 5,626,661 A | 5/1997 | Schmid et al. |

(Continued)

FOREIGN PATENT DOCUMENTS

| CN | 1513039 A | 7/2004 |
| CN | 1563210 A | 1/2005 |

(Continued)

OTHER PUBLICATIONS

Lewis, Peter A. "Colorants: Organic and Inorganic Pigments" Color for Science, Art and Technology, Chapter 10; Elsevier Science B.V.; K. Nassau (editor) (1998) pp. 283-312.*

(Continued)

*Primary Examiner* — Kaj K Olsen
*Assistant Examiner* — Ross J Christie
(74) *Attorney, Agent, or Firm* — Ostrolenk Faber LLP

(57) ABSTRACT

Multilayer pearlescent pigments comprising platelet-shaped transparent substrates provided with an optically active coating, where the optically active coating includes at least
a) an absorbing high-index layer A having a refractive index $n \geq 1.8$
b) a low-index layer B having a refractive index $n < 1.8$
c) a high-index layer C having a refractive index $n \geq 1.8$
and also
d) optionally at least one outer protective layer D
and where the multilayer pearlescent pigments have a cumulative frequency distribution of a volume-averaged size distribution function, with the indices $D_{10}$, $D_{50}$, $D_{90}$ and a span $\Delta D$ in a range from 0.7-1.4, the span $\Delta D$ being calculated in accordance with formula (I)

$$\Delta D = (D_{90} - D_{10})/D_{50} \quad (I).$$

The disclosure further relates to a method for producing these multilayer pearlescent pigments, and also to their use.

16 Claims, 1 Drawing Sheet

(56) References Cited

U.S. PATENT DOCUMENTS

| | | | |
|---|---|---|---|
| 5,653,792 A * | 8/1997 | Phillips et al. | 106/400 |
| 5,958,125 A | 9/1999 | Schmid et al. | |
| 6,063,179 A | 5/2000 | Schmid et al. | |
| 6,139,614 A | 10/2000 | Schmid et al. | |
| 6,193,794 B1 | 2/2001 | Schmid et al. | |
| 6,337,131 B1 | 1/2002 | Rupaner et al. | |
| 6,533,857 B1 | 3/2003 | Schmid et al. | |
| 6,620,233 B1 | 9/2003 | Seeger et al. | |
| 6,949,138 B2 | 9/2005 | Nakamura et al. | |
| 7,077,897 B2 | 7/2006 | Brueckner et al. | |
| 7,169,222 B2 | 1/2007 | Bruckner et al. | |
| 7,300,510 B2 | 11/2007 | Seeger et al. | |
| 7,396,401 B2 | 7/2008 | Jungnitz et al. | |
| 7,413,599 B2 | 8/2008 | Henglein et al. | |
| 7,517,404 B2 * | 4/2009 | Bujard et al. | 106/481 |
| 7,594,962 B2 * | 9/2009 | Bujard et al. | 106/481 |
| 7,691,196 B2 | 4/2010 | Pfaff et al. | |
| 7,993,443 B2 | 8/2011 | Fuller et al. | |
| 2005/0013934 A1 * | 1/2005 | Xiong et al. | 106/415 |
| 2006/0042507 A1 * | 3/2006 | Bujard et al. | 106/415 |
| 2006/0042509 A1 | 3/2006 | Henglein et al. | |
| 2006/0225609 A1 | 10/2006 | Rueger et al. | |
| 2006/0257662 A1 * | 11/2006 | Bujard et al. | 106/415 |
| 2007/0259182 A1 * | 11/2007 | Bujard et al. | 106/404 |
| 2008/0011198 A1 | 1/2008 | Fu et al. | |
| 2009/0169499 A1 * | 7/2009 | Bujard et al. | 106/482 |
| 2009/0258251 A1 | 10/2009 | Abe et al. | |
| 2009/0274735 A1 | 11/2009 | Wakamiya | |
| 2009/0311209 A1 * | 12/2009 | Bujard | 106/441 |
| 2010/0203093 A1 * | 8/2010 | Bujard et al. | 106/403 |
| 2010/0297045 A1 | 11/2010 | Kaupp et al. | |
| 2011/0226161 A1 * | 9/2011 | Schumacher et al. | 106/417 |
| 2011/0265690 A1 * | 11/2011 | Schumacher et al. | 106/417 |

FOREIGN PATENT DOCUMENTS

| | | |
|---|---|---|
| CN | 101415783 A | 4/2009 |
| DE | 4141069 A1 | 6/1993 |
| DE | 4319669 A1 | 1/1994 |
| DE | 19614637 A1 | 10/1997 |
| DE | 19802234 A1 | 7/1998 |
| DE | 19808657 A1 | 9/1999 |
| DE | 19822046 A1 | 11/1999 |
| DE | 19907313 A1 | 8/2000 |
| DE | 19941253 A1 | 3/2001 |
| DE | 19953655 A1 | 5/2001 |
| DE | 10221497 A1 | 11/2003 |
| DE | 10 2004 041 586 A1 | 3/2006 |
| EP | 0289240 A1 | 11/1998 |
| EP | 0 881 998 B1 | 12/1998 |
| EP | 0948572 B1 | 7/2003 |
| EP | 0753545 B2 | 5/2006 |
| EP | 1980594 B1 | 6/2009 |
| JP | A-2000-281932 | 10/2000 |
| JP | 2000-319540 A | 11/2000 |
| JP | A-2004-532284 | 10/2004 |
| JP | A-2005-502738 | 1/2005 |
| JP | A-2005-042112 | 2/2005 |
| JP | A-2007-508447 | 4/2007 |
| JP | A-2007-126643 | 5/2007 |
| JP | A-2007-327059 | 12/2007 |
| JP | A-2008-174698 | 7/2008 |
| JP | A-2008-546880 | 12/2008 |
| WO | WO 00/24946 | 5/2000 |
| WO | WO 02/090448 A2 | 11/2002 |
| WO | WO 03/006558 A2 | 1/2003 |
| WO | WO 2004/055119 A1 | 7/2004 |
| WO | WO 2004/056716 A1 | 7/2004 |
| WO | WO 2004/067645 A2 | 8/2004 |
| WO | WO 2005/063637 A1 | 7/2005 |
| WO | WO 2006/021386 A1 | 3/2006 |
| WO | WO 2006/110359 A2 | 10/2006 |
| WO | WO 2006110359 A2 * | 10/2006 |
| WO | WO 2008/122420 A1 | 10/2008 |
| WO | WO 2009/010288 A2 | 1/2009 |
| WO | WO 2009/103322 A1 | 8/2009 |

OTHER PUBLICATIONS

International Search Report dated Nov. 30, 2010, issued in corresponding international application No. PCT/EP2010/004865.

Byk-Gardner Katalog 2007/2008, p. 14, in German and an English translation thereof.

International Preliminary Report on Patentability dated Mar. 13, 2012 in corresponding International Application No. PCT/EP2010/004865.

European Examination Report dated Jun. 13, 2012 in corresponding European Patent Application No. 10 742 439.2-1218 (with English translation).

Notice of Reasons for Rejection dated Sep. 11, 2012 in corresponding Japanese Patent Application No. 2012-525072 (with English language translation).

Office Action dated Apr. 5, 2013 in U.S. Appl. No. 13/131,671.

Decision of Refusal dated May 14, 2013 in corresponding Japanese Patent Application No. 2012-525074 (English language translation).

German Search Report dated Aug. 5, 2011 in corresponding German Application No. 10 2009 037 934.7.

Communication from the European Patent Office regarding Intention to Grant dated Nov. 19, 2012 in corresponding European Patent Application No. 10 742 439.2 (with English language translation).

Office Action dated Jul. 25, 2013 in corresponding Chinese Patent Application No. 201080007542.1 (English language translation.

Notice of Reasons for Rejection dated Dec. 3, 2013 in corresponding Japanese Patent Application No. 2012-525071 (with English language translation).

Notice of Reasons for Rejection dated Dec. 3, 2013 in corresponding Japanese Patent Application No. 2012-525072 (with English language translation).

* cited by examiner

Effect of particle properties on laser diffraction
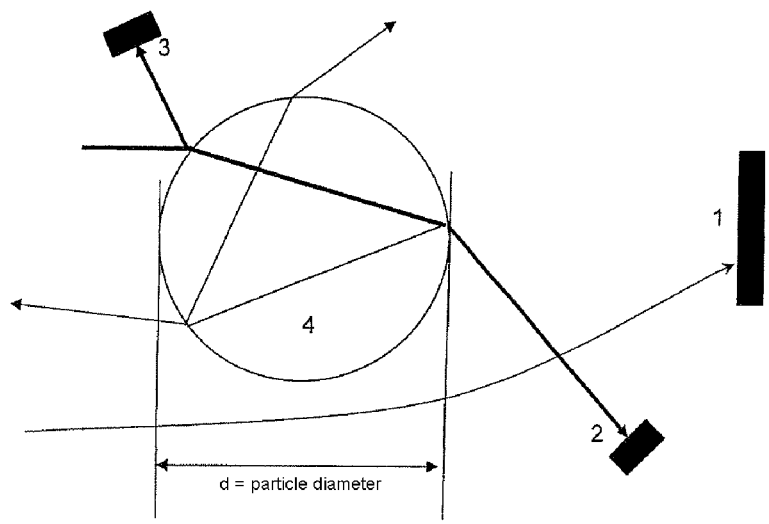
Particle properties:
d: diameter
1: diffraction
2: refraction
3: reflection
4: absorption

HIGH-GLOSS MULTILAYER EFFECT PIGMENTS HAVING A CHROMATIC INTERFERENCE COLOR AND A NARROW SIZE DISTRIBUTION, AND METHOD FOR THE PRODUCTION THEREOF

CROSS REFERENCE TO RELATED APPLICATIONS

The present application is a 35 U.S.C. §371 National Phase conversion of PCT/EP2010/004865, filed Aug. 9, 2010, which claims benefit of German Application No. 10 2009 037 934.7, filed Aug. 19, 2009, the disclosure of which is incorporated herein by reference. The PCT International Application was published in the German language.

TECHNICAL FIELD

The present invention relates to highly lustrous multilayer pearlescent pigments with a chromatic interference color and to a method for producing the same, and to the use thereof in cosmetic formulations, plastics, films, textiles, ceramic materials, glasses, and coating compositions such as paints, printing inks, liquid inks, varnishes or powder coatings.

BACKGROUND

The optical effect of effect pigments is based on the directed reflection of light from light-refracting pigment particles which are predominantly two-dimensional in form and are oriented substantially parallel to one another. These pigment particles generally have a substantially transparent substrate and one or more coatings on the substrate. Depending on the composition of the coating or coatings on the pigment particles, interference, reflection and/or absorption phenomena produce impressions of color and lightness.

Irregularities in the substrate surface to be coated, or colored impurities in or on the substrate, may lead to unwanted scattered-light effects and hence to a reduced luster and also to instances of unclean color in the end product. Particularly when natural substrate materials are used, such as natural mica, these unwanted scattered-light effects and/or colored impurities arise.

The fundamental construction of pearlescent pigments and hence also of multilayer pearlescent pigments with an alternating arrangement of layers of high and low refractive index is known. Reference is made, exemplarily, to patent applications DE 41 41 069 A1, DE 43 19 669 A1, DE 196 14 637 A1, DE 198 02 234 A1, DE 198 08 657 A1, DE 198 22 046 A1, DE 199 07 313 A1, DE 199 41 253 A1, DE 199 53 655 A1 or DE 102 21 497 A1.

WO 2004/055119 A1 describes interference pigments based on coated, platelet-shaped substrates. The substrates in this case are covered with a first layer of $SiO_2$, over which is applied, subsequently, a high-index layer, consisting for example of $TiO_2$, $ZrO_2$, $SnO_2$, $Cr_2O_3$, $Fe_2O_3$ or $Fe_3O_4$, or an interference system comprising alternating high-index and low-index layers. The pigments may optionally also have an outer protective layer. In this way, silver-white interference pigments, or interference pigments with brilliant interference colors, are obtained, which are notable for performance properties, such as mechanical stability and photo stability, but which do not have a high gloss. The color of the interference pigments is not dependent or is only minimally dependent on the angle.

Thermally and mechanically stable metal oxide-coated effect pigments based on thin glass flakes with a thickness ≤1.0 μm are known from WO 2002/090448 A2. The effect pigments may be covered with one or more high-index and/or low-index layer(s). The glass flakes possess a softening temperature of ≥800° C.

Goniochromatic luster pigments are described in EP 0 753 545 B2. At least one layer stack comprising a colorless low-index coating and a reflecting, selectively or nonselectively absorbing coating, and also, optionally, an outer protective layer, is applied here to a multiply coated, high-index, non-metallic, platelet-shaped substrate. The layer thickness of the low-index colorless coating reduces as the number of layer stacks applied to the substrate increases. The goniochromatic luster pigments exhibit an angle-dependent color change between two or more intense interference colors.

In accordance with WO 2004/067645 A2, a transparent substrate is coated with an uneven number—at least three—of layers of high and low refractive index in alternation. The difference in refractive index between the adjacent layers is at least 0.2. At least one of the layers differs in its optical thickness from the others. The resulting multilayer effect pigments therefore do not possess a layer construction in which the optical thickness of each layer is an uneven multiple of a quarter of the light wavelength for interference (no "quarter-wave-stack" construction).

Multilayer interference pigments with strong interference colors and/or with a strong angular dependency of the interference colors, consisting of a transparent base material coated with alternating layers of metal oxides of low and high refractive index, are described in EP 0 948 572 B1. The difference in the refractive indices is at least 0.1. The number and thickness of the layers are dependent on the desired effect and on the substrate used. Considering the construction $TiO_2$—$SiO_2$—$TiO_2$ on a mica substrate, for example, pigments with a blue interference color are obtained when optically thin $TiO_2$ and $SiO_2$ layers with a layer thickness <100 nm are used, said pigments being more strongly colored than pure $TiO_2$-mica pigments. The incidence of thick $SiO_2$ layers with a layer thickness >100 nm produces pigments having a strongly pronounced angular dependency of the interference color.

The optical properties of effect pigments can be influenced, according to WO 2006/110359 A2, by a suitable particle size distribution. The glass flakes described here, classified and coated with a single metal oxide layer, have a $D_{10}$ of at least 9.5 μm, preferably of 9.5 μm. A disadvantage is that the pigments have to have a size range with a $D_{90}$ of not more than 85 μm, preferably of about 45 μm.

The prior art discloses various multilayer pearlescent pigments which possess appealing optical properties. Nevertheless, there continues to be a demand for improved products.

SUMMARY

It is an object of the present invention to provide multilayer pearlescent pigments with improved luster. The multilayer pearlescent pigments ought additionally to have a relatively high chroma.

Multilayer pearlescent pigments with a color flop ought as far as possible to have a higher color flop than the multilayer pearlescent pigments from the prior art.

The object has been achieved through provision of multilayer pearlescent pigments, comprising platelet-shaped transparent substrates provided with an optically active coating, where the optically active coating comprises at least a) an absorbing high-index layer A having a refractive index n≥1.8,
b) a low-index layer B having a refractive index n<1.8
c) a high-index layer C having a refractive index n≥1.8
and also
d) optionally at least one outer protective layer D and where the multilayer pearlescent pigments have a cumulative frequency distribution of a volume-averaged size distribution function, with the indices $D_{10}$, $D_{50}$, $D_{90}$ and a span $\Delta D$ from a range of 0.7-1.4, the span $\Delta D$ being calculated in accordance with formula (I)

$$\Delta D = (D_{90} - D_{10})/D_{50} \quad (I).$$

Preferred developments are specified in dependent claims 2 to 10.

The object has additionally been achieved through provision of a method for producing the multilayer pearlescent pigments of the invention, where the method comprises the following steps:

(i) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with the formula $\Delta D = (D_{90} - D_{10})/D_{50}$, (ii) applying at least the layers A to C to the platelet-shaped transparent substrates, and also, optionally, at least one layer D, or (iii) applying at least the layers A to C to the platelet-shaped transparent substrates, and also, optionally, at least one layer D, (iv) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with the formula $\Delta D = (D_{90} - D_{10})/D_{50}$.

According to one preferred variant of the invention, the platelet-shaped transparent substrates to be coated are first of all size-classified in accordance with step (i) and then in step (ii) at least the layers A to C and optionally at least one layer D are applied to the platelet-shaped transparent substrates.

Further provided by the invention is the use of the multilayer pearlescent pigments of the invention in cosmetic formulations, plastics, films, textiles, ceramic materials, glasses, and coating compositions such as paints, printing inks, varnishes, and powder coatings.

The object on which the invention is based is also achieved through provision of an article, where the article comprises or has the multilayer pearlescent pigments of any of claims 1 to 10.

The invention accordingly likewise provides preparations, such as cosmetic formulations, plastics, ceramic materials, glasses, or coating compositions such as paints, printing inks, varnishes, and powder coatings, which comprise the multilayer pearlescent pigments of the invention. The invention is also directed to articles which are provided—coated or printed, for example—with the multilayer pearlescent pigments of the invention. Accordingly, coated articles, such as bodyworks, facing elements, etc., or printed articles, such as paper, card, films, textiles, etc., are likewise part of the present invention.

BRIEF DESCRIPTION OF THE DRAWING

FIG. 1 shows the effect of particle properties on laser diffraction.

DETAILED DESCRIPTION

Multilayer pearlescent pigments having improved gloss are understood for the purposes of this invention to be multilayer pearlescent effect pigments which have at least three coatings on a transparent platelet-shaped substrate, where these at least three coatings are a) an absorbing high-index layer A having a refractive index $n \geq 1.8$, b) a low-index layer B having a refractive index $n < 1.8$, c) a high-index layer C having a refractive index $n \geq 1.8$.

Suitable platelet-shaped transparent substrates to be coated are nonmetallic, natural or synthetic platelet-shaped substrates. The substrates are preferably substantially transparent, more preferably transparent, which means that they are at least partly transmissive to visible light.

In accordance with the invention, the layer A is internal in the layer arrangement, i.e., is facing the platelet-shaped transparent substrate; the layer B is situated between the layer A and the layer C, and the layer C, based on the platelet-shaped transparent substrate, is external in the layer arrangement.

Between the platelet-shaped transparent substrate and the layer A there may be one or more further, preferably substantially transparent, layers arranged. According to one preferred development, the layer A is applied directly to the transparent platelet-shaped substrate.

Between the layer A and the layer B, and also between the layer B and the layer C, there may be arranged, independently of one another, one or more further, preferably substantially transparent, layers. According to one preferred development, the layer B is applied directly to the layer A. According to another preferred development, the layer C is applied directly to the layer B.

With especial preference, the layer A is applied directly to the platelet-shaped transparent substrate, the layer B directly to the layer A, the layer C directly to the layer B, and also, optionally, the layer D directly to the layer C.

The inventors have surprisingly observed that the multilayer pearlescent pigments of the invention, i.e., pearlescent pigments with the specified layer arrangement and a span $\Delta D$ according to formula I in the range from 0.7 to 1.4, exhibit an extremely strong gloss. According to one further variant of the invention, the multilayer pearlescent pigments of the invention also have a high chroma at an observation angle close to the specular angle, preferably 15°.

The provision of multilayer pearlescent pigments with a strong luster and preferably also a high chroma at the same time has hitherto not been possible in the art.

The fact that the span $\Delta D$, as defined in claim 1, might have an influence on the luster is unexpected in light of the published prior art. The present invention accordingly allows the provision of multilayer pearlescent pigments which have extremely appealing optical properties.

In the prior art, the span $\Delta D$ was not hitherto recognized as an essential feature. Conventional multilayer pearlescent pigments therefore have a broad span.

The size distribution of the multilayer pearlescent pigments is characterized in accordance with the invention by using the span $\Delta D$, defined as $\Delta D = (D_{90} - D_{10})/D_{50}$ (formula I). The smaller the span, the narrower the size distribution.

The $D_{10}$, $D_{50}$ or $D_{90}$ value in the cumulative frequency distribution of the volume-averaged size distribution function, as is obtained by laser diffraction methods, indicates that 10%, 50%, and 90%, respectively, of the multilayer pearlescent pigments have a diameter which is the same as or smaller than the respectively indicated value. In this case, the size distribution curve is determined using an instrument from Malvern (instrument: Malvern Mastersizer 2000) in accordance with manufacturer indications.

In this instrument, the scattered light signals were evaluated in accordance with the theory of Mie, which also includes refraction and absorption behavior on the part of the particles (FIG. 1).

The multilayer pearlescent pigments of the invention possess a span ΔD in a range from 0.7 to 1.4, preferably in a range from 0.7 to 1.3, more preferably in a range from 0.8 to 1.2, very preferably in a range from 0.8 to 1.1. In further-preferred embodiments the span ΔD is in a range from 0.85 to 1.05.

Where the multilayer pearlescent pigments have a span ΔD of more than 1.4, the multilayer pearlescent pigments obtained are not highly lustrous. Multilayer pearlescent pigments below a span ΔD of 0.7 are very complicated to prepare by the usual techniques, and hence can no longer be produced economically.

The span ΔD of the platelet-shaped transparent substrate to be coated corresponds substantially to that of the multilayer pearlescent pigment of the invention and is ≤1.4, preferably ≤1.3, more preferably ≤1.2, very preferably ≤1.1, and especially preferably ≤1.05.

The multilayer pearlescent pigments of the invention may have any desired average particle size ($D_{50}$). The $D_{50}$ values of the multilayer pearlescent pigments of the invention are situated preferably within a range from 3 to 350 μm. The multilayer pearlescent pigments of the invention preferably have a $D_{50}$ value from a range from 3 to 15 μm or from a range from 10 to 35 μm or from a range from 25 to 45 μm or from a range from 30 to 65 μm or from a range from 40 to 140 μm or from a range from 135 to 250 μm.

The $D_{10}$ values of the multilayer pearlescent pigments of the invention encompass preferably a range from 1 to 120 μm. The multilayer pearlescent pigments of the invention preferably have the combinations of $D_{10}$, $D_{50}$, and $D_{90}$ values that are indicated in table 1. In this combined only in such a way as to produce a span ΔD from a range from 0.7 to 1.4, preferably from a range from 0.7 to 1.3, more preferably from a range from 0.8 to 1.2, very preferably from a range from 0.8 to 1.1, and especially preferably from a range from 0.85 to 1.05. Combinations of $D_{10}$, $D_{50}$, and $D_{90}$ values that lead to a span ΔD which is not situated in the range ΔD from 0.7 to 1.4 are not inventive embodiments.

TABLE 1

Preferred combinations of ranges of the $D_{10}$, $D_{50}$, and $D_{90}$ values

| $D_{10}$ (μm) | $D_{50}$ (μm) | $D_{90}$ (μm) |
|---|---|---|
| 1-5 | 3-15 | 8-25 |
| 5-25 | 10-35 | 20-45 |
| 10-30 | 25-45 | 40-70 |
| 20-45 | 30-65 | 70-110 |
| 25-65 | 40-140 | 120-180 |
| 75-110 | 135-250 | 400-490 |

In this context it has emerged, surprisingly, that the size of the multilayer pearlescent pigments, characterized with the $D_{50}$ value, is not critical, and instead that the span $\Delta D = (D_{90} - D_{10})/D_{50}$ is in a narrow range from 0.7 to 1.4. The $D_{50}$ values of the multilayer pearlescent pigments may be, for example, 15, 20, 25 or 30 μm or else 50, 80, 100, 150, 200, 250, 300 or 350 μm.

According to one preferred embodiment of the invention, the multilayer pearlescent pigments exhibit only one (number: 1) interference color. With this variant of the invention, therefore, there is substantially no angle-dependent switch between two or more interference colors. When the viewing angle is changed, there is a change in the lightness of the interference color—for example, from light to dark or vice versa—but there is no switch in the interference color. The multilayer pearlescent pigments of the invention according to this variant, therefore, do not have an angle-dependent interference color switch. If a paint or ink layer, in addition to the multilayer pearlescent pigments of the invention in accordance with this variant, also comprises other color pigments, the perceived color may undergo angle-dependent change, but this is not a switch between interference colors, but instead is a switch between an interference color and the absorption color of the color pigments additionally present.

According to another preferred embodiment of the invention, the multilayer pearlescent pigments have at least two interference colors. With this variant of the invention, therefore, there is an angle-dependent switch between two or more interference colors. When the viewing angle is changed, therefore, there is a change in the interference color—for example, from red to green. The multilayer pearlescent pigments of the invention according to this variant thus have an angle-dependent interference color switch and may also be referred to as goniochromatic multilayer pearlescent pigments.

According to a further preferred embodiment of the invention, the multilayer pearlescent pigments of the invention do not have a silver interference color. A feature of the multilayer pearlescent pigments of the invention is that they are preferably colored at a near-specular viewing angle, but are not silver-colored. The multilayer pearlescent pigments of the invention therefore differ significantly not only from silver-colored interference pigments but also from metallic effect pigments, especially from, for example, silver-colored aluminum effect pigments.

The multilayer pearlescent pigments of the invention preferably have at least one interference color which is selected from the group consisting of yellow, violet, blue, red, green, and gradations thereof, but which does not include a silver interference color. The interference color in question may range from dark to light.

Multilayer pearlescent pigments without a silver interference color are understood for the purposes of this invention to be multilayer pearlescent pigments whose chroma values $C^*_{15}$ are >20.

The chroma values here are determined from the following applications: a nitrocellulose varnish (Dr. Renger Erco Bronzemischlack 2615e; Morton) containing 6% by weight of multilayer pearlescent pigments, the % by weight figure being based on the total weight of the varnish, is applied, depending on $D_{50}$ value, in a wet film thickness in accordance with table 2, to BYK-Gardner black/white drawdown charts (Byko-Chart 2853), and subsequently dried at room temperature. Then, using a BYK-MAC, colorimetric evaluations are performed on these drawdown charts, with measurement taking place on the black background of the drawdown chart. The incident angle is 45° and the chroma value employed is that at an observation angle of 15°.

TABLE 2

Wet film thickness as a function of the $D_{50}$ value of the multilayer pearlescent pigments

| $D_{50}$ value | Wire doctor |
|---|---|
| <40 μm | 36 μm |
| 40 μm-85 μm | 76 μm |
| >85 μm | 100 μm |

The multilayer pearlescent pigments of the invention are notable for a strong luster and also preferably, at the same time, for a high chroma $C^*_{15} > 20$.

According to one preferred variant of the invention, the chroma $C^*_{15}$ of the multilayer pearlescent pigments of the invention is at least 22, preferably at least 24, more preferably at least 25. A chroma in the range from 24 to 50 has proven very suitable.

Suitable platelet-shaped transparent substrates to be coated are nonmetallic, natural or synthetic platelet-shaped substrates. The substrates are preferably substantially transparent, more preferably transparent, which means that they are at least partly transmissive to visible light.

According to one preferred embodiment of the invention, the platelet-shaped transparent substrates may be selected from the group consisting of natural mica, synthetic mica, glass flakes, $SiO_2$ platelets, $Al_2O_3$ platelets, polymer platelets, platelet-shaped bismuth oxychloride, platelet-shaped substrates comprising a hybrid organic-inorganic layer, and mixtures thereof. The platelet-shaped transparent substrates are preferably selected from the group consisting of natural mica, synthetic mica, glass flakes, $SiO_2$ platelets, $Al_2O_3$ platelets, and mixtures thereof. With particular preference the platelet-shaped transparent substrates are selected from the group consisting of natural mica, synthetic mica, glass flakes, and mixtures thereof. Especially preferred are glass flakes and synthetic mica, and mixtures thereof.

In contrast to synthetic platelet-shaped transparent substrates, natural mica possesses the disadvantage that contaminations, as a result of incorporated extraneous ions, may alter the hue, and that the surface is not ideally smooth but instead may have irregularities, such as steps, for example. Even when a natural substrate is used, however, it has surprisingly emerged that the luster of a plurality of multilayer pearlescent pigments can be increased when the span ΔD is in a range from 0.7 to 1.4, as compared with a plurality of conventional, broad-span multilayer pearlescent pigments.

Synthetic substrates such as, for example, glass flakes or synthetic mica, in contrast, have smooth surfaces, a uniform thickness within an individual substrate particle, and sharp edges. Consequently the surface offers only a few scattering centers for incident and reflected light, and accordingly, after coating, allows more highly lustrous multilayer pearlescent pigments than with natural mica as substrate. If they are coated in accordance with the invention with high-index and low-index layers, this results in very uniform colors. All of these effects advantageously contribute to obtaining highly chromatic multilayer pearlescent pigments having pronounced gloss. Glass flakes used are preferably those which are produced by the methods described in EP 0 289 240 A1, WO 2004/056716 A1, and WO 2005/063637 A1. The glass flake substrates which can be used may have, for example, a composition in accordance with the teaching of EP 1 980 594 B1.

The average geometric thickness of the platelet-shaped transparent substrates to be coated is in a range from 50 nm to 5000 nm, preferably in a range from 60 nm to 3000 nm, and more preferably in a range from 70 nm to 2000 nm. In one embodiment, the average geometric thickness for glass flakes as the substrate to be coated is in a range from 750 nm to 1500 nm. Glass flakes of this kind are available commercially on a broad basis. Further advantages are offered by thinner glass flakes. The thinner substrates result in a lower overall layer thickness of the multilayer pearlescent pigments of the invention. Preference is therefore likewise given to glass flakes whose average geometric thickness is in a range from 100 nm to 700 nm, more preferably in a range from 150 nm to 600 nm, very preferably in a range from 170 nm to 500 nm, and especially preferably in a range from 200 nm to 400 nm. In another embodiment, the average geometric thickness for natural or synthetic mica as the substrate to be coated is preferably in a range from 100 nm to 700 nm, more preferably in a range from 150 nm to 600 nm, very preferably in a range from 170 nm to 500 nm, and especially preferably in a range from 200 nm to 400 nm.

If platelet-shaped transparent substrates below an average geometric thickness of 50 nm are coated with high-index metal oxides, then the multilayer pearlescent pigments obtained are extremely fracture-sensitive, and may completely fragment even during incorporation into the application medium, with the consequence of a significant reduction in luster. Above an average geometric substrate thickness of 5000 nm, the multilayer pearlescent pigments may become too thick overall. This is accompanied by a poorer specific opacity, i.e., surface area hidden per unit weight of multilayer pearlescent pigment of the invention, and also by a lower plane-parallel orientation in the application medium. The result of a poorer orientation, in turn, is a reduced luster.

The average geometric thickness of the platelet-shaped transparent substrate is determined on the basis of a cured varnish film in which the multilayer pearlescent pigments are aligned substantially plane-parallel to the substrate. For this purpose, a ground section of the cured varnish film is investigated under a scanning electron microscope (SEM), the geometric thickness of the platelet-shaped transparent substrate of 100 multilayer pearlescent pigments being determined and averaged statistically.

In the multilayer pigments of the invention, the optical effects are brought about by the layer structure having the layers A to C, on which incident light produces the perceptible color effects by physical effects such as reflection, interference, absorption, light diffraction, etc.

As optically active layers or coatings it is preferred to apply layers which comprise metal oxides, metal oxide hydrates, metal hydroxides, metal suboxides, metals, metal fluorides, metal oxyhalides, metal chalcogenides, metal nitrides, metal oxynitrides, metal sulfides, metal carbides or mixtures thereof. According to one preferred variant, the optically active layers or coatings consist of the aforementioned materials.

The terms layers or coatings are used interchangeably for the purposes of this invention, unless otherwise indicated.

The refractive index of the high-index layers A and C is in each case $n \geq 1.8$, preferably $n \geq 1.9$, and more preferably $n \geq 2.0$. The refractive index of the low-index layer B is $n < 1.8$, preferably $n < 1.7$, and more preferably $n < 1.6$.

In accordance with the invention, the layer A is an absorbing high-index layer. This layer A may be selectively absorbing—that is, absorbing in a narrow wavelength range. The layer A may also be nonselectively absorbing, i.e., absorbing over the entire wavelength range of visible light.

In the multilayer pearlescent pigments of the invention, the layer C may be absorbing or nonabsorbing. If the layer C is absorbing, the layer C may be selectively absorbing or nonselectively absorbing, as set out above in relation to the layer A. The layer C may have an identical chemical composition to the layer A. The layer C, however, may also have a chemical composition which is different from the layer A.

A nonabsorbing layer C may also be referred to as a transparent layer.

Examples of suitable high-index, selectively absorbing materials include
colored metal oxides or metal oxide hydrates such as iron (III) oxide (α- and/or γ-$Fe_2O_3$, red), FeO(OH) (yellow), chromium(III) oxide (green), titanium(III) oxide ($Ti_2O_3$, blue), vanadium pentoxide (orange), colored nitrides such as titanium oxynitrides and titanium nitride ($TiO_xN_y$, TiN, blue), the lower titanium oxides and nitrides generally being present in a mixture with titanium dioxide, metal sulfides such as cerium sulfide (red), iron titanates such as pseudobrookite (brownish red) and/or pseudorutile (brownish red), tin-antimony oxide $Sn(Sb)O_2$, nonabsorbing, colorless, high-index materials, e.g., metal oxides such as titanium dioxide and zirconium dioxide that are colored with selectively absorbing colorants. This coloration may be accomplished by incorporation of colorants into the metal oxide layer, by the doping thereof with selectively absorbing metal cations or colored metal oxides such as iron(III) oxide, or by coating of the metal oxide layer with a film comprising a colorant.

Examples of high-index, nonselectively absorbing materials include metals such as molybdenum, iron, tungsten, chromium, cobalt, nickel, silver, palladium, platinum, mixtures thereof or alloys thereof, metal oxides such as magnetite $Fe_3O_4$, cobalt oxide (CoO and/or $CO_3O_4$), vanadium oxide ($VO_2$ and/or $V_2O_3$), and also mixtures of these oxides with metals, more particularly magnetite and (metallic) iron, iron titanates such as ilmenite, metal sulfides such as molybdenum sulfide, iron sulfide, tungsten sulfide, chromium sulfide, cobalt sulfide, nickel sulfide, silver sulfide, tin sulfide, mixtures of these sulfides, mixtures of these sulfides with the respective metal, such as $MoS_2$ and Mo, and mixtures with oxides of the respective metal, such as $MoS_2$ and molybdenum oxides, nonabsorbing, colorless, high-index layers such as titanium dioxide or zirconium dioxide into which nonselectively absorbing material (e.g., carbon) has been incorporated or which are coated therewith.

The high-index, nonabsorbing materials include, for example, metal oxides such as titanium dioxide, zirconium dioxide, zinc oxide, tin dioxide, antimony oxide, and mixtures thereof, metal hydroxides, metal oxide hydrates, metal sulfides such as zinc sulfide, metal oxyhalides such as bismuth oxychloride.

The layers A and/or C may in each case also be mixtures of different selectively and/or nonselectively absorbing components, preferably metal oxides. For example, the different components, preferably metal oxides, may be present in the form of a homogeneous mixture. It is also possible, however, for one component to be present in the other component in the form of a dope.

For example, in the layer A and/or C, there may be a nonabsorbing component present, titanium oxide for example, preferably $TiO_2$, as a dope in a selectively absorbing component, preferably $Fe_2O_3$, and/or in a nonselectively absorbing component, $Fe_3O_4$ for example. Alternatively, a selectively absorbing component, $Fe_2O_3$ for example, and/or a nonselectively absorbing component, $Fe_3O_4$ for example, may be present as a dope in a nonabsorbing component, titanium oxide for example, preferably $TiO_2$.

It is of course also possible that mixtures of more than two components, as demonstrated above, are present in the layer A and/or C.

One preferred embodiment uses metal oxides, metal hydroxides and/or metal oxide hydrates as high-index layer A and/or C. Particular preference is given to the use of metal oxides. With very particular preference, the layer A comprises iron oxide and the layer C titanium dioxide and/or iron oxide and also mixtures thereof. In one embodiment, the layer A is composed of iron oxide and the layer C of titanium dioxide and/or iron oxide and also mixtures thereof.

Where the multilayer pearlescent pigments of the invention have a coating with titanium dioxide, the titanium dioxide may be present in the rutile or anatase crystal modification. The titanium dioxide layer is preferably in the rutile form. The rutile form can be obtained by, for example, applying a layer of tin dioxide to the platelet-shaped transparent substrate to be coated, before the titanium dioxide layer is applied. Titanium dioxide crystallizes in the rutile modification on this layer of tin dioxide. This tin dioxide may take the form of a separate layer, in which case the layer thickness may be a few nanometers, as for example less than 10 nm, more preferably less than 5 nm, even more preferably less than 3 nm.

Nonabsorbing materials are suitable as low-index layer B. These materials include, for example, metal oxides such as silicon dioxide, aluminum oxide, boron oxide, metal oxide hydrates such as silicon oxide hydrate, aluminum oxide hydrate, metal fluorides such as magnesium fluoride, $MgSiO_3$.

The low-index metal oxide layer may optionally comprise alkali metal oxides and/or alkaline earth metal oxides as constituents.

The low-index layer B preferably comprises silicon dioxide. In one embodiment, the low-index layer B consists of silicon dioxide.

The interference-capable coating may either envelop the substrate completely or may be present only partially on the substrate. The multilayer pearlescent pigments of the invention are distinguished by the uniform, homogeneous construction of the coating which envelops the platelet-shaped substrate completely and covers not only its top and bottom faces.

The individual layers of the multilayer pearlescent pigments of the invention may each be designed as $\lambda/4$ layers. It has surprisingly emerged, however, that it is not necessary for the layers to have to be designed as $\lambda/4$ layers in order for highly lustrous and preferably also highly chromatic multilayer pearlescent pigments to be obtained. It is the span of the size distribution that is the key parameter for obtaining highly lustrous and preferably also high-chroma multilayer pearlescent pigments.

The optical thickness of the nonmetallic layers with high and low refractive indices determines the optical properties of the multilayer pearlescent pigments. The number and thickness of the layers may be set depending on the desired effect and the substrate used.

If n is the refractive index of a layer and d is its thickness, the interference color in which a thin layer appears is given by the product of n and d, i.e., the optical thickness. The colors of such a film that come about in the reflecting light under normal light incidence result from a strengthening of the light of the wavelength $$\lambda = \frac{4}{2N-1} \cdot nd$$

and by attenuation of light of the wavelength $$\lambda = \frac{2}{N} \cdot nd,$$

where N is a positive integer. The variation in color that occurs with increasing film thickness results from the strengthening or attenuation of particular wavelengths of the light through interference.

In the case of multilayer pigments, the interference color is determined by the strengthening of particular wavelengths, and, if two or more layers in a multilayer pigment possess the same optical thickness, the color of the reflecting light becomes more intense as the number of layers increases. In addition, a particularly strong variation of the color may be achieved depending on the viewing angle by suitably selecting the layer thickness of the low-index layer B. A pronounced color flop can thus be developed.

The multilayer pearlescent pigments of the invention may have optical layer thicknesses of the high-index layers A and C which are in each case in the range from 30 nm to 900 nm, preferably in the range from 40 nm to 880 nm, and more preferably in the range from 50 nm to 850 nm. The optical layer thickness of the low-index layer B may be in a range from 30 nm to 500 nm.

In the case of metals, the geometric layer thicknesses of the layer A and/or C are 10 nm to 50 nm, preferably 15 nm to 30 nm. The layer thicknesses must be set such that the layers have semitransparent properties. Depending on the metal used, this may result in different layer thicknesses.

The layer thicknesses indicated in this application are, unless otherwise indicated, the optical layer thicknesses. By an optical layer thickness is meant, in accordance with the invention, the product of geometric layer thickness and the refractive index of the material which constitutes the layer. As the value for the refractive index of the material in question, the value known in each case from the literature is used. In accordance with the invention, the geometric layer thickness is determined on the basis of SEM micrographs of ground sections of varnishes containing multilayer pearlescent pigments oriented plane-parallel to the substrate.

Preferred developments of the invention encompass the following layer sequences applied to the platelet-shaped transparent substrate, beginning with the layer A, then layer B, and finally layer C:
1. Layer A: selectively absorbing and high-index
   Layer B: low-index
   Layer C: selectively absorbing and high-index
2. Layer A: nonselectively absorbing and high-index
   Layer B: low-index
   Layer C: selectively absorbing and high-index
3. Layer A: selectively absorbing and high-index
   Layer B: low-index
   Layer C: nonselectively absorbing and high-index
4. Layer A: nonselectively absorbing and high-index
   Layer B: low-index
   Layer C: nonselectively absorbing and high-index
5. Layer A: selectively absorbing and high-index
   Layer B: low-index
   Layer C: nonabsorbing (transparent) and high-index
6. Layer A: nonselectively absorbing and high-index
   Layer B: low-index
   Layer C: nonabsorbing (transparent) and high-index The layer sequences specified above may in each case also have at least one outer protective layer D, which is optionally organochemically modified.

According to one preferred development of the present invention, the layer B in the layer sequences specified above has an optical layer thickness (or path length) of ≤150 nm, preferably of <140 nm, more preferably of <130 nm. An optical layer thickness of the layer B in the range from 30 nm to ≤150 nm, preferably in the range from 40 nm to 140 nm, and more preferably in the range from 50 nm to 130 nm has proven very suitable.

If the optical layer thickness of the layer B is ≤150 nm, the multilayer pearlescent pigments of the invention have sub-stantially no angle-dependent interference color. In this embodiment, the multilayer pearlescent pigments of the invention have only one interference color, with its intensity changing from light to dark in dependence on the viewing angle. With this variant of the multilayer pearlescent pigments of the invention, therefore, highly lustrous and highly chromatic effect pigments are obtained.

According to a further preferred development of the present invention, in the layer sequences specified above, the layer B has an optical layer thickness of >150 nm, preferably of >180 nm, more preferably of >220 nm. An optical layer thickness of the layer B in the range from >150 nm to 500 nm, preferably in the range from 180 nm to 480 nm, and more preferably in the range from 220 nm to 450 nm has proven very suitable.

If the optical layer thickness of the layer B is >150 nm, the multilayer pearlescent pigments of the invention have an angle-dependent interference color. In this embodiment, the multilayer pearlescent pigments of the invention have at least two interference colors in dependence on the viewing angle. With this embodiment of the multilayer pearlescent pigments of the invention, they may also be referred to as goniochromatic pearlescent pigments. In this variant of the multilayer pearlescent pigments of the invention, therefore, highly lustrous pearlescent pigments with an intense color flop are obtained. These multilayer pearlescent pigments, for example, may have an interference color switch from red to green or from blue to yellow.

The transition between multilayer pearlescent pigments with no color flop, weak color flop, and intense color flop in dependence on the optical layer thickness of the low-index layer B is a fluid one. As the optical layer thickness of the low-index layer B increases, above 150 nm, initially, multilayer pearlescent pigments are obtained which have only a weak color flop, which ultimately, as the optical layer thickness of layer B continues to rise, turns into an intense color flop. An intense color flop typically extends over a plurality of quadrants in the CIELab color coordinate system.

According to one preferred development of the invention, the following embodiments are particularly preferred:
1. Layer A: selectively absorbing and high-index
   Layer B: low-index, optical layer thickness ≤150 nm, preferably from a range from 30 nm to 140 nm
   Layer C: selectively absorbing and high-index
2. Layer A: nonselectively absorbing and high-index
   Layer B: low-index, optical layer thickness ≤150 nm, preferably from a range from 30 nm to 140 nm
   Layer C: selectively absorbing and high-index
3. Layer A: selectively absorbing and high-index
   Layer B: low-index, optical layer thickness ≤150 nm, preferably from a range from 30 nm to 140 nm
   Layer C: nonselectively absorbing and high-index
4. Layer A: nonselectively absorbing and high-index
   Layer B: low-index, optical layer thickness ≤150 nm, preferably from a range from 30 nm to 140 nm
   Layer C: nonselectively absorbing and high-index
5. Layer A: selectively absorbing and high-index
   Layer B: low-index, optical layer thickness ≤150 nm, preferably from a range from 30 nm to 140 nm
   Layer C: nonabsorbing (transparent) and high-index
6. Layer A: nonselectively absorbing and high-index
   Layer B: low-index, optical layer thickness ≤150 nm, preferably from a range from 30 nm to 140 nm
   Layer C: nonabsorbing (transparent) and high-index The layer sequences specified above may each also have at least one outer protective layer D, which is optionally organochemically modified. In the case of the six embodiments specified above, the optical layer thickness of the layer B, according to one further preferred embodiment, is in the range from 40 nm to 140 nm, more preferably from 50 nm to 130 nm. The layer B is preferably silicon oxide, more preferably $SiO_2$. The layer A is preferably iron oxide, and the layer C is preferably $TiO_2$ for transparent layers and iron oxide for absorbing layers.

According to a further variant of the invention, multilayer pearlescent pigments are preferred which have an angle-dependent change in the interference color. In dependence on the viewing angle, these multilayer pearlescent pigments have two or more interference colors and may therefore be referred to as goniochromatic multilayer pearlescent pigments. Preferred embodiments are indicated below:

1. Layer A: selectively absorbing and high-index
   Layer B: low-index, optical layer thickness >150 nm, preferably from a range from 165 nm to 450 nm
   Layer C: selectively absorbing and high-index
2. Layer A: nonselectively absorbing and high-index
   Layer B: low-index, optical layer thickness >150 nm, preferably from a range from 165 nm to 450 nm
   Layer C: selectively absorbing and high-index
3. Layer A: selectively absorbing and high-index
   Layer B: low-index, optical layer thickness >150 nm, preferably from a range from 165 nm to 450 nm
   Layer C: nonselectively absorbing and high-index
4. Layer A: nonselectively absorbing and high-index
   Layer B: low-index, optical layer thickness >150 nm, preferably from a range from 165 nm to 450 nm
   Layer C: nonselectively absorbing and high-index
5. Layer A: selectively absorbing and high-index
   Layer B: low-index, optical layer thickness >150 nm, preferably from a range from 165 nm to 450 nm
   Layer C: nonabsorbing (transparent) and high-index
6. Layer A: nonselectively absorbing and high-index
   Layer B: low-index, optical layer thickness >150 nm, preferably from a range from 165 nm to 450 nm
   Layer C: nonabsorbing (transparent) and high-index The optical layer thickness B of the aforementioned multilayer pearlescent pigments is preferably in the range from >150 nm to 500 nm, more preferably from 180 nm to 480 nm. Above an optical layer thickness of 500 nm, the multilayer pearlescent pigment becomes too thick overall. Relatively thick pearlescent pigments may not so readily adopt a plane-parallel orientation in the application medium, and, accordingly, also suffer a loss of luster.

The layer B is preferably composed of silicon oxide, preferably $SiO_2$. The layer A is preferably selectively absorbing or nonselectively absorbing iron oxide, and the layer C is preferably $TiO_2$ for transparent layers and iron oxide for absorbing layers.

In accordance with the invention, the following specific layer sequences are particularly preferred:

I. Multilayer Pearlescent Pigments with Only One (Number: 1) Interference Color, i.e., without Angle-Dependent Switch of Interference Color Layer A: selectively absorbing iron oxide, preferably $Fe_2O_3$
Layer B: silicon oxide, preferably $SiO_2$, optical layer thickness ≤150 nm, preferably from a range from 40 nm to 140 nm
Layer C: titanium oxide, preferably titanium dioxide
Layer A: selectively absorbing iron oxide, preferably $Fe_2O_3$
Layer B: silicon oxide, preferably $SiO_2$, optical layer thickness ≤150 nm, preferably from a range from 40 nm to 140 nm
Layer C: titanium oxide, preferably titanium dioxide, and selectively absorbing iron oxide, preferably $Fe_2O_3$
Layer A: selectively absorbing iron oxide, preferably $Fe_2O_3$
Layer B: silicon oxide, preferably $SiO_2$, optical layer thickness ≤150 nm, preferably from a range from 40 nm to 140 nm
Layer C: titanium oxide, preferably titanium dioxide, and nonselectively absorbing iron oxide, preferably $Fe_3O_4$
Layer A: selectively absorbing iron oxide, preferably $Fe_2O_3$
Layer B: silicon oxide, preferably $SiO_2$, optical layer thickness ≤150 nm, preferably from a range from 40 nm to 140 nm
Layer C: nonselectively absorbing iron oxide, preferably $Fe_3O_4$, and selectively absorbing iron oxide, preferably $Fe_2O_3$
Layer A: selectively absorbing iron oxide, preferably $Fe_2O_3$
Layer B: silicon oxide, preferably $SiO_2$, optical layer thickness ≤150 nm, preferably from a range from 40 nm to 140 nm
Layer C: selectively absorbing iron oxide, preferably $Fe_2O_3$
Layer A: nonselectively absorbing iron oxide, preferably $Fe_3O_4$
Layer B: silicon oxide, preferably $SiO_2$, optical layer thickness ≤150 nm, preferably from a range from 40 nm to 140 nm
Layer C: selectively absorbing iron oxide, preferably $Fe_2O_3$
Layer A: nonselectively absorbing iron oxide, preferably $Fe_3O_4$
Layer B: silicon oxide, preferably $SiO_2$, optical layer thickness ≤150 nm, preferably from a range from 40 nm to 140 nm
Layer C: titanium oxide, preferably $TiO_2$
Layer A: nonselectively absorbing iron oxide, preferably $Fe_3O_4$
Layer B: silicon oxide, preferably $SiO_2$, optical layer thickness ≤150 nm, preferably from a range from 40 nm to 140 nm
Layer C: selectively absorbing iron oxide, preferably $Fe_2O_3$, and titanium oxide, preferably $TiO_2$
Layer A: nonselectively absorbing iron oxide, preferably $Fe_3O_4$
Layer B: silicon oxide, preferably $SiO_2$, optical layer thickness ≤150 nm, preferably from a range from 40 nm to 140 nm
Layer C: nonselectively absorbing iron oxide, preferably $Fe_3O_4$, and titanium oxide, preferably $TiO_2$
Layer A: nonselectively absorbing iron oxide, preferably $Fe_3O_4$
Layer B: silicon oxide, preferably $SiO_2$, optical layer thickness ≤150 nm, preferably from a range from 40 nm to 140 nm
Layer C: selectively absorbing iron oxide, preferably $Fe_2O_3$, and nonselectively absorbing iron oxide, preferably $Fe_3O_4$ The high-index layers A and C for the aforementioned preferred multilayer pearlescent pigments preferably have independently of one another an optical layer thickness of 40 to 880 nm and more preferably 50 to 850 nm.

II. Multilayer Pearlescent Pigments with at Least Two Interference Colors, i.e., with Angle-Dependent Switch of Interference Color Layer A: selectively absorbing iron oxide, preferably $Fe_2O_3$
Layer B: silicon oxide, preferably $SiO_2$, optical layer thickness >150 nm, preferably 180 to 480 nm
Layer C: titanium oxide, preferably titanium dioxide
Layer A: selectively absorbing iron oxide, preferably $Fe_2O_3$
Layer B: silicon oxide, preferably $SiO_2$, optical layer thickness >150 nm, preferably 180 to 480 nm
Layer C: titanium oxide, preferably titanium dioxide, and selectively absorbing iron oxide, preferably $Fe_2O_3$ Layer A: selectively absorbing iron oxide, preferably $Fe_2O_3$
Layer B: silicon oxide, preferably $SiO_2$, optical layer thickness >150 nm, preferably 180 to 480 nm
Layer C: titanium oxide, preferably titanium dioxide, and nonselectively absorbing iron oxide, preferably $Fe_3O_4$
Layer A: selectively absorbing iron oxide, preferably $Fe_2O_3$
Layer B: silicon oxide, preferably $SiO_2$, optical layer thickness >150 nm, preferably 180 to 480 nm
Layer C: nonselectively absorbing iron oxide, preferably $Fe_3O_4$, and selectively absorbing iron oxide, preferably $Fe_2O_3$
Layer A: selectively absorbing iron oxide, preferably $Fe_2O_3$
Layer B: silicon oxide, preferably $SiO_2$, optical layer thickness >150 nm, preferably 180 to 480 nm
Layer C: selectively absorbing iron oxide, preferably $Fe_2O_3$
Layer A: nonselectively absorbing iron oxide, preferably $Fe_3O_4$
Layer B: silicon oxide, preferably $SiO_2$, optical layer thickness >150 nm, preferably 180 to 480 nm
Layer C: selectively absorbing iron oxide, preferably $Fe_2O_3$
Layer A: nonselectively absorbing iron oxide, preferably $Fe_3O_4$
Layer B: silicon oxide, preferably $SiO_2$, optical layer thickness >150 nm, preferably 180 to 480 nm
Layer C: titanium oxide, preferably $TiO_2$
Layer A: nonselectively absorbing iron oxide, preferably $Fe_3O_4$
Layer B: silicon oxide, preferably $SiO_2$, optical layer thickness >150 nm, preferably 180 to 480 nm
Layer C: selectively absorbing iron oxide, preferably $Fe_2O_3$, and titanium oxide, preferably $TiO_2$
Layer A: nonselectively absorbing iron oxide, preferably $Fe_3O_4$
Layer B: silicon oxide, preferably $SiO_2$, optical layer thickness >150 nm, preferably 180 to 480 nm
Layer C: nonselectively absorbing iron oxide, preferably $Fe_3O_4$, and titanium oxide, preferably $TiO_2$
Layer A: nonselectively absorbing iron oxide, preferably $Fe_3O_4$
Layer B: silicon oxide, preferably $SiO_2$, optical layer thickness >150 nm, preferably 180 to 480 nm
Layer C: selectively absorbing iron oxide, preferably $Fe_2O_3$, and nonselectively absorbing iron oxide, preferably $Fe_3O_4$ The high-index layers A and C for the aforementioned preferred multilayer pearlescent pigments preferably have independently of one another an optical layer thickness of 40 to 880 nm and more preferably 50 to 850 nm.

The layer thicknesses indicated in this application are, unless otherwise indicated, the optical layer thicknesses. By an optical layer thickness is meant, in accordance with the invention, the product of geometric layer thickness and the refractive index of the material which constitutes the layer. As the value for the refractive index of the material in question, the value known in each case from the literature is used. In accordance with the invention, the geometric layer thickness is determined on the basis of SEM micrographs of ground sections of varnishes containing multilayer pearlescent pigments oriented plane-parallel to the substrate.

The multilayer pearlescent pigments may additionally be provided with at least one outer protective layer D, which further increases the stability of the multilayer pearlescent pigment with respect to light, weather and/or chemicals. The outer protective layer D may also be an aftercoat which facilitates the handling of the pigment on incorporation into different media.

The outer protective layer D of the multilayer pearlescent pigments of the invention may comprise or, preferably, consist of one or two metal oxide layers of the elements Si, Al or Ce. In one variant a silicon oxide layer, preferably $SiO_2$ layer, is applied as outermost metal oxide layer. Particular preference here is given to a sequence in which first of all a cerium oxide layer is applied, which is then followed by an $SiO_2$ layer, as described in WO 2006/021386 A1, the content of which is hereby incorporated by way of reference.

The outer protective layer D may additionally be organic-chemically modified on the surface. For example, one or more silanes may be applied to this outer protective layer. The silanes may be alkylsilanes having branched-chain or unbranched alkyl radicals having 1 to 24 C atoms, preferably 6 to 18 C atoms.

The silanes may alternatively be organofunctional silanes which allow chemical attachment to a plastic, a binder of a paint or of an ink, etc.

The organofunctional silanes which are used preferably as surface modifiers and which have suitable functional groups are available commercially and are produced, for example, by Evonik and sold under the trade name "Dynasylan". Further products may be purchased from Momentive (Silquest silanes) or from Wacker, examples being standard silanes and α-silanes from the GENIOSIL product group.

Examples of these products are 3-methacryloyloxypropyl-trimethoxysilane (Dynasylan MEMO, Silquest A-174NT), vinyltri(m)ethoxysilane (Dynasylan VTMO or VTEO, Silquest A-151 or A-171), methyltri(m)ethoxysilane (Dynasylan MTMS or MTES), 3-mercaptopropyltrimethoxy-silane (Dynasylan MTMO; Silquest A-189), 3-glycidyloxy-propyltrimethoxysilane (Dynasylan GLYMO, Silquest A-187), tris[3-(trimethoxysilyl)propyl] isocyanurate (Silquest Y-11597), bis[3-(triethoxysilyl)propyl)] tetrasulfide (Silquest A-1289), bis[3-(triethoxy-silyl)propyl disulfide (Silquest A-1589, beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl)(m)-ethyldimethoxysilane (GENIOSIL XL 32, XL 34), (isocyanatomethyl)methyldimethoxysilane, (isocyanatomethyl)trimethoxysilane, 3-(triethoxysilyl)propyl-succinic anhydride (GENIOSIL GF 20), (methacryloyloxy-methyl)methyldiethoxysilane, 2-acryloyloxyethylmethyl-dimethoxysilane, 2-methacryloyloxyethyltrimethoxy-silane, 3-acryloyloxypropylmethyldimethoxysilane, 2-acryloyloxyethyltrimethoxysilane, 2-methacryloyloxy-ethyltriethoxysilane, 3-acryloyloxypropyltrimethoxy-silane, 3-acryloyloxypropyltripropoxysilane, 3-meth-acryloyloxypropyltriethoxysilane, 3-methacryloyloxy-propyltriacetoxysilane, 3-methacryloyloxypropylmethyl-dimethoxysilane, vinyltrichlorosilane, vinyltrimethoxy-silane (GENIOSIL XL 10), vinyltris (2-methoxyethoxy)silane (GENIOSIL GF 58), and vinyltriacetoxysilane.

As organofunctional silanes it is preferred to use 3-methacryloyloxypropyltrimethoxysilane (Dynasylan MEMO, Silquest A-174NT), vinyltri(m)ethoxysilane (Dynasylan VTMO or VTEO, Silquest A-151 or A-171), methyltri(m)ethoxysilane (Dynasylan MTMS or MTES), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxy-methyltri(m)ethoxysilane (GENIOSIL XL 33, XL 36), (methacryloyloxymethyl)(m)ethyldimethoxysilane (GENIOSIL XL 32, XL 34), 3-(triethoxysilyl)propyl-succinic anhydride (GENIOSIL GF 20), vinyltrimethoxy-silane (GENIOSIL XL 10) and/or vinyltris (2-methoxy-ethoxy)silane (GENIOSIL GF 58).

It is, however, also possible to apply other organo-functional silanes to the multilayer pearlescent pigments of the invention.

It is additionally possible to use aqueous prehydro-lyzates that are obtainable, for example, commercially from Degussa. These include, among others, aqueous aminosiloxane (Dynasylan Hydrosil 1151), aqueous amino-/alkyl-functional siloxane (Dynasylan Hydrosil 2627 or 2909), aqueous diamino-functional siloxane (Dynasylan Hydrosil 2776), aqueous epoxy-functional siloxane (Dynasylan Hydrosil 2926), amino-/alkyl-functional oligosiloxane (Dynasylan 1146), vinyl-/alkyl-functional oligosiloxane (Dynasylan 6598), oligomeric vinylsilane (Dynasylan 6490) or oligomeric short-chain alkyl-functional silane (Dynasylan 9896).

In one preferred embodiment, the organofunctional silane mixture comprises at least one amino-functional silane as well as at least one silane without a functional binding group. The amino function is a functional group which is able to enter into one or more chemical interactions with the majority of groups that are present in binders. This may involve a covalent bond, such as with isocyanate functions or carboxylate functions of the binder, for example, or hydrogen bonds such as with OH functions or COOR functions, or else ionic interactions. An amino function is therefore very highly suitable for the purpose of the chemical attachment of the multi-layer pearlescent pigment to different kinds of binders.

For this purpose it is preferred to take the following compounds: 3-aminopropyltrimethoxysilane (Dynasylan AMMO; Silquest A-1110), 3-aminopropyltriethoxysilane (Dynasylan AMEO), [3-(2-aminoethyl)aminopropyl]trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltri-methoxysilane (Silquest Y-9669), 4-amino-3,3-dimethyl-butyltrimethoxysilane (Silquest A-1637), N-cyclohexyl-aminomethylmethyldiethoxysilane (GENIOSIL XL 924), N-cyclohexylaminomethyltriethoxysilane (GENIOSIL XL 926), N-phenylaminomethyltrimethoxysilane (GENIOSIL XL 973), and mixtures thereof.

In a further-preferred embodiment, the silane without a functional binding group is an alkylsilane. The alkyl-silane preferably has the formula (A):

$$R_{(4-z)}Si(X)_z \quad (A)$$

In this formula, z is an integer from 1 to 3, R is a substituted or unsubstituted, unbranched or branched alkyl chain having 10 to 22 C atoms, and X is a halogen group and/or alkoxy group. Preference is given to alkylsilanes having alkyl chains having at least 12 C atoms. R may also be joined cyclically to Si, in which case z is typically 2.

At or on the surface of the multilayer pearlescent pigments of the invention, in addition to the aforementioned silanes and silane mixtures, there may also be further organic-chemical modifiers arranged, such as, for example, substituted or unsubstituted alkyl radicals, polyethers, thioethers, siloxanes, etc., and mixtures thereof. It is, however, also possible for inorganic-chemical modifiers (e.g., $Al_2O_3$ or $ZrO_2$ or mixtures thereof) to be applied to the pigment surface, these modifiers being able, for example, to increase the dispersibility and/or compatibility in the respective application medium.

Via the surface modification it is possible, for example, to modify and/or set the hydrophilicity or hydrophobicity of the pigment surface. For example, via the surface modification, it is possible to modify and/or set the leafing or nonleafing properties of the multilayer pearlescent pigments of the invention. By leafing is meant that, in an application medium, such as a paint or a printing ink, for example, the multi-layer pearlescent pigments of the invention take up a position at or close to the interface or surface of the application medium.

The surface modifiers may also have reactive chemical groups, such as, for example, acrylate, methacrylate, vinyl, isocyanate, cyano, epoxy, hydroxyl or amino groups or mixtures thereof. These chemically reactive groups allow chemical attachment, especially formation of covalent bonds, to the application medium or to components of the application medium, such as binders, for example. By this means it is possible to make improvements in, for example, the chemical and/or physical properties of cured varnishes, paints or printing inks, such as resistance to environmental influences such as humidity, insolation, UV resistance, etc., or with respect to mechanical influences, examples being scratches, etc.

The chemical reaction between the chemically reactive groups and the application medium or components of the application medium may be induced, for example, by irradiation of energy, in the form of UV radiation and/or heat, for example.

For the incorporation of multilayer pearlescent pigments aftercoated with silanes and/or provided with an outer protective layer into cosmetic formulations it is necessary to ensure that the corresponding silane and/or the material of the outer protective layer is allowable in accordance with cosmetics law.

The multilayer pearlescent pigments of the invention are suitable more particularly for use in cosmetics, such as, for example, body powders, face powders, pressed and loose powder, face makeup, powder cream, cream makeup, emulsion makeup, wax makeup, foundation, mousse makeup, rouge, eye makeup such as eyeshadow, mascara, eyeliners, liquid eyeliners, eyebrow pencil, lipcare stick, lipstick, lip gloss, lip liner, hairstyling compositions such as hairspray, hair mousse, hair gel, hair wax, hair mascara, permanent or semipermanent hair colors, temporary hair colors, skincare compositions such as lotions, gels, and emulsions, and also nail varnish compositions.

In order to obtain specific color effects it is possible, in the cosmetics applications, to use not only the multilayer pearlescent pigments of the invention but also further colorants and/or conventional effect pigments or mixtures thereof in variable proportions. Conventional effect pigments used may be, for example, commercial pearlescent pigments based on natural mica coated with high-index metal oxides (such as, for example, the Prestige product group from Eckart), BiOCl platelets, $TiO_2$ platelets, pearlescent pigments based on synthetic mica coated with high-index metal oxides or based on glass platelets coated with high-index metal oxides (such as, for example, the MIRAGE product group from Eckart), $Al_2O_3$, $SiO_2$ or $TiO_2$ platelets. Moreover, it is also possible for metallic effect pigments to be added, such as the Visionaire product group from Eckart, for example. The colorants may be selected from inorganic or organic pigments.

A method for producing the multilayer pearlescent pigments of the invention comprises the following steps:

i) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with the formula $\Delta D=(D_{90}-D_{10})/D_{50}$, (ii) applying at least the layers A to C to the platelet-shaped transparent substrates, and also, optionally, at least one layer D, or (iii) applying at least the layers A to C to the platelet-shaped transparent substrates, and also, optionally, at least one layer D, (iv) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with the formula $\Delta D=(D_{90}-D_{10})/D_{50}$.

If the initial substrates are too large, it is possible, optionally, for a comminuting step to be carried out prior to the size-classifying.

The size-classifying may take place before or after the coating of the substrates. Advantageously, however, the substrate is first classified and then coated. Size-classifying is carried out, and optionally repeated, until the multilayer pearlescent pigments have the size distribution according to the invention.

A narrow span $\Delta D$ for the substrates may be achieved by suitable comminuting and/or classifying operations on the platelet-shaped transparent substrates to be coated. The platelet-shaped transparent substrates to be coated may be comminuted, for example, by ball mill, jet or agitator ball mill, edge-runner mill or dissolver. The span $\Delta D$ of the final fraction can be adjusted by appropriate classifying, such as a multiple wet screening, for example. Other classifying methods include centrifugation in cyclones or sedimentation from a dispersion.

The comminuting and classifying operations may take place in succession and optionally may be combined with one another. Hence a comminuting operation may be followed by a classifying operation, which is followed by a further comminuting operation on the fine fraction, and so on.

The metal oxide layers are preferably applied wet-chemically, in which case the wet-chemical coating methods developed for the production of pearlescent pigments may be employed. In the case of wet coating, the substrate particles are suspended in water and are admixed with one or more hydrolyzable metal salts or with a waterglass solution at a pH which is suitable for hydrolysis and which is selected such that the metal oxides and/or metal oxide hydrates are precipitated directly on the substrate to be coated, without any instances of secondary precipitation. The pH is typically held constant by simultaneous metered addition of a base and/or acid. The pigments are subsequently separated off, washed, dried at 50-150° C. for 6-18 hours, and optionally calcined for 0.5-3 hours, it being possible for the calcining temperature to be optimized in terms of the particular coating present. Generally speaking, the calcining temperatures are between 500 and 1000° C., preferably between 600 and 900° C. If desired, the pigments, following application of individual coatings, may be separated off, dried, and optionally calcined, before then being resuspended for the precipitation of the further layers.

The precipitation of the $SiO_2$ layer onto the platelet-shaped transparent substrate to be coated may be accomplished by addition of a potassium or sodium waterglass solution at a suitable pH. The $SiO_2$ layer may alternatively be applied via sol-gel methods, starting from alkoxysilanes, such as tetraethoxysilane, for example.

EXAMPLES

The invention is elucidated in more detail below through a number of examples, without being confined to these examples.

I Preparation of the Pigments
A Classification of the Substrates

Inventive Example 1

Classification of Glass Flakes with Narrow Span $\Delta D=1.0$

A suspension of 200 g of glass flakes (GF100M from Glassflake Ltd) in FD water (FD=fully demineralized, approximately 3% by weight content) was classified on a 100 µm sieve, and the sieve undersize was sieved again on a 63 µm sieve. This sieving procedure was repeated twice with sieve residue obtained on the 63 µm sieve. This gave a glass flake fraction having the following particle size distribution (Malvern Mastersizer 2000): $D_{10}$=50 µm, $D_{50}$=82 µm, $D_{90}$=132 µm, span $\Delta D$=1.0.

Comparative Example 1

Classification of Glass Flakes with Broad Span $\Delta D=2.0$

A suspension of 200 g of glass flakes (GF 100M from Glassflake Ltd) in FD water (approximately 3% by weight content) was classified on a 150 µm sieve, and the sieve undersize was sieved again on a 34 µm sieve. This sieving procedure was repeated twice with sieve residue obtained on the 34 µm sieve. This gave a glass flake fraction having the following particle size distribution (Malvern Mastersizer 2000): $D_{10}$=25 µm, $D_{50}$=88 µm, $D_{90}$=200 µm, span $\Delta D$=1.99.

Inventive Example 2

Classification of Synthetic Mica with Narrow Span $\Delta D=1.2$

A suspension of 200 g of artificial mica Sanbao 10-40 (Shantou F.T.Z. Sanbao Pearl Luster Mica Tech Co., Ltd. China) in FD water (about 3% by weight content) was classified on a 34 µm sieve, and the sieve undersize was again sieved on a 20 µm sieve. This sieving procedure was repeated twice with sieve residue obtained on the 20 µm sieve. This gave a mica fraction which had the following particle size distribution (Malvern Mastersizer 2000): $D_{10}$=14 µm, $D_{50}$=26 µm, $D_{90}$=45 µm, span $\Delta D$=1.2.

Comparative Example 2

Classification of Synthetic Mica with Broad Span $\Delta D=3.7$ 1000 g of commercial unclassified synthetic/artificial mica Sanbao (from Shantou F.T.Z. Sanbao Pearl Luster Mica Tech Co., Ltd. China) was admixed with 1000 ml of FD water, and subsequently delaminated for approximately 1 h in a laboratory edge-runner mill from American Cyanamid Company.

The cake was subsequently diluted with FD water to a solids content of 25% by weight and treated in a Pendraulik TD 200 laboratory dissolver for 1 h. In the course of this treatment, care is to be taken to ensure that, by cooling, the temperature of the suspension does not exceed 80° C.

The suspension was subsequently brought with FD water to a solids content of 3% by weight and was sieved on a Sweco Separator laboratory sieve to <250 µm. The resulting mica fraction was then filtered off under suction on a Büchner funnel, and the filtercake obtained was used as starting material for further coatings.

This gave a mica fraction having the following particle size distribution (Malvern Mastersizer 2000): $D_{10}=17.7$ μm, $D_{50}=74.6$ μm, $D_{90}=292.3$ μm, span $\Delta D=3.7$.

B Preparation of Single-Layer Pigments (Starting Material for Multilayer Pearlescent Pigments)

Comparative Example 3

Preparation of the Starting Material for Inventive Examples 3 and 4

200 g of glass flakes from inventive example 1 were suspended in 2000 ml of FD water and heated to 80° C. with turbulent stirring. The pH of the suspension was adjusted to 1.9 using dilute HCl, and then a first layer of "$SnO_2$" was precipitated onto the glass flakes. This layer was formed by addition of a solution consisting of 3 g of $SnCl_4 \times 5\,H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was raised to 3.0 using dilute HCl, and then a solution of 42 ml of $FeCl_3$ (280 g $Fe_2O_3$/l) was metered into the suspension. During the addition, the pH was kept constant at 3.0 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color and a slightly orange-red absorption color.

Comparative Example 4

Preparation of the Starting Material for Comparative Examples 6 and 7

200 g of glass flakes from comparative example 1 were suspended in 2000 ml of FD water and heated to 80° C. with turbulent stirring. The pH of the suspension was adjusted to 1.9 using dilute HCl, and then a first layer of "$SnO_2$" was precipitated onto the glass flakes. This layer was formed by addition of a solution consisting of 3 g of $SnCl_4 \times 5\,H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was raised to 3.0 using dilute HCl, and then a solution of 42 ml of $FeCl_3$ (280 g $Fe_2O_3$/l) was metered into the suspension. This was followed by stirring for 15 min more, by filtration, and by washing of the filtercake with FD water. The filtercake was dried initially at 100° C. and calcined at 650° C. for 30 min. This gave an effect pigment with a silver interference color and light orange-red absorption color.

Comparative Example 5

Synthetic Mica/$Fe_2O_3$ 200 g of synthetic mica from inventive example 2 were suspended in 2000 ml of FD water and heated to 80° C. with turbulent stirring. The pH of the suspension was adjusted to 3.0 using dilute HCl, and then a solution of 230 ml of $FeCl_3$ (280 g $Fe_2O_3$/l FD water) was metered into the suspension. During the addition, the pH was kept constant at 3.0 by counter-control with 10% strength by weight NaOH solution. This was followed by stirring for 15 min more, by filtration, and by washing of the filtercake with FD water. The filtercake was dried initially at 100° C. and calcined at 750° C. for 30 min. This gave a lustrous bronze-colored pearlescent pigment.

C Preparation of the Multilayer Pearlescent Pigments

Inventive Example 3

Glass Flakes/$Fe_2O_3$/$SiO_2$/$Fe_2O_3$ 200 g of glass flakes from comparative example 3 were suspended in 1400 ml of isopropanol and heated to 70° C. with turbulent stirring. This suspension was admixed with 75 g of tetraethoxysilane, 75 g of FD water, and 5 ml of 10% strength by weight $NH_3$ solution. The reaction mixture was stirred for approximately 12 h, after which it was filtered, and the filtercake was washed with isopropanol and dried in a vacuum drying cabinet at 100° C.

100 g of the resulting $SiO_2$-coated glass flakes were suspended in 700 ml of FD water and heated to 80° C. with turbulent stirring. The pH of the suspension was adjusted to 1.9 using dilute HCl, and then a first layer of "$SnO_2$" was precipitated onto the coated glass flakes. This layer was formed by addition of a solution consisting of 1.5 g of $SnCl_4 \times 5\,H_2O$ (in 5 ml of conc. HCl+25 ml of FD water), with simultaneous metered addition of a 10% strength by weight NaOH solution in order to keep the pH constant, over a period of 1 h. In order to complete the precipitation, the suspension was stirred for 15 min more. Thereafter the pH was raised to 3.0 using dilute HCl, and then a solution of 42.5 ml of $FeCl_3$ (280 g $Fe_2O_3$/l) was metered into the suspension. This was followed by stirring for 15 min more, by filtration, and by washing of the filtercake with FD water. The filtercake was initially dried at 100° C. and calcined at 650° C. for 30 min. This gave a highly lustrous multilayer pearlescent pigment having an orange interference color and red absorption color.

Inventive Example 4

Glass Flakes/$Fe_2O_3$/$SiO_2$/$TiO_2$ (Rutile)

200 g of glass flakes from comparative example 3 were suspended in 1400 ml of isopropanol and heated to 70° C. with turbulent stirring. This suspension was admixed with 75 g of tetraethoxysilane, 75 g of FD water, and 5 ml of 10% strength by weight $NH_3$ solution. The reaction mixture was stirred for approximately 12 h, after which it was filtered, and the filtercake was washed with isopropanol and dried in a vacuum drying cabinet at 100° C.

100 g of the resulting $SiO_2$-coated glass flakes were suspended in 700 ml of FD water and heated to 80° C. with turbulent stirring. The pH of the suspension was adjusted to 1.9 using dilute HCl, and then a first layer of "$SnO_2$" was precipitated onto the coated glass flakes. This layer was formed by addition of a solution consisting of 1.5 g of $SnCl_4 \times 5\,H_2O$ (in 5 ml of conc. HCl+25 ml of FD water), with simultaneous metered addition of a 10% strength by weight NaOH solution in order to keep the pH constant, over a period of 1 h. In order to complete the precipitation, the suspension was stirred for 15 min more. Thereafter the pH was lowered to 1.6 using dilute HCl, and then a solution of 85 ml of $TiCl_4$ (200 g $TiO_2$/l FD water) was metered into the suspension. During this addition, the pH was kept constant at 1.6 by counter-control with 10% strength by weight NaOH solution. This was followed by stirring for min more, by filtration, and by washing of the filtercake with FD water. The filtercake was initially dried at 100° C. and calcined at 650° C. for 30 min. This gave an extremely highly lustrous effect pigment having a green interference color.

Comparative Example 6

Glass Flakes/$Fe_2O_3$/$SiO_2$/$Fe_2O_3$ 200 g of glass flakes from comparative example 4 were suspended in 1400 ml of isopropanol and heated to 70° C. with turbulent stirring. This suspension was admixed with 75 g of tetraethoxysilane, 75 g of FD water, and 5 ml of 10% strength by weight $NH_3$ solution. The reaction mixture was stirred for approximately 12 h, after which it was filtered, and the filtercake was washed with isopropanol and dried in a vacuum drying cabinet at 100° C.

100 g of the resulting $SiO_2$-coated glass flakes were suspended in 700 ml of FD water and heated to 80° C. with turbulent stirring. The pH of the suspension was adjusted to 1.9 using dilute HCl, and then a first layer of "$SnO_2$" was precipitated onto the coated glass flakes. This layer was formed by addition of a solution consisting of 1.5 g of $SnCl_4 \times 5 H_2O$ (in 5 ml of conc. HCl+25 ml of FD water), with simultaneous metered addition of a 10% strength by weight NaOH solution in order to keep the pH constant, over a period of 1 h. In order to complete the precipitation, the suspension was stirred for 15 min more. Thereafter the pH was raised to 3.0 using dilute HCl, and then a solution of 42.5 ml of $FeCl_3$ (280 g $Fe_2O_3$/l) was metered into the suspension. This was followed by stirring for 15 min more, by filtration, and by washing of the filtercake with FD water. The filtercake was initially dried at 100° C. and calcined at 650° C. for 30 min. This gave a multilayer pearlescent pigment having a reddish-orange interference color and a red absorption color.

Comparative Example 7

Glass Flakes/$Fe_2O_3$/$SiO_2$/$TiO_2$ (Rutile)

200 g of glass flakes from comparative example 4 were suspended in 1400 ml of isopropanol and heated to 70° C. with turbulent stirring. This suspension was admixed with 75 g of tetraethoxysilane, 75 g of FD water, and 5 ml of 10% strength by weight $NH_3$ solution. The reaction mixture was stirred for approximately 12 h, after which it was filtered, and the filtercake was washed with isopropanol and dried in a vacuum drying cabinet at 100° C.

100 g of the resulting $SiO_2$-coated glass flakes were suspended in 700 ml of FD water and heated to 80° C. with turbulent stirring. The pH of the suspension was adjusted to 1.9 using dilute HCl, and then a first layer of "$SnO_2$" was precipitated onto the coated glass flakes. This layer was formed by addition of a solution consisting of 1.5 g of $SnCl_4 \times 5 H_2O$ (in 5 ml of conc. HCl+25 ml of FD water), with simultaneous metered addition of a 10% strength by weight NaOH solution in order to keep the pH constant, over a period of 1 h. In order to complete the precipitation, the suspension was stirred for 15 min more. Thereafter the pH was lowered to 1.6 using dilute HCl, and then a solution of 85 ml of $TiCl_4$ (200 g $TiO_2$/l FD water) was metered into the suspension. During this addition, the pH was kept constant at 1.6 by counter-control with 10% strength by weight NaOH solution. This was followed by stirring for min more, by filtration, and by washing of the filtercake with FD water. The filtercake was initially dried at 100° C. and calcined at 650° C. for 30 min. This gave a lustrous effect pigment having a bluish-green interference color.

Inventive Example 5

Synthetic Mica/$Fe_2O_3$/$SiO_2$/$Fe_2O_3$ 200 g of synthetic mica from inventive example 2 were suspended in 2000 ml of FD water and heated to 80° C. with turbulent stirring. The pH of the suspension was adjusted to 3.0 using dilute HCl, and then a solution of 60 ml of $FeCl_3$ (280 g $Fe_2O_3$/l FD water) was metered into the suspension. During the addition, the pH was kept constant at 3.0 by counter-control with 10% strength by weight NaOH solution. In order to complete the precipitation, the suspension was stirred for a further 15 min. Thereafter the pH was raised to 7.5 using 5% strength by weight NaOH solution, and stirring was carried out for 15 min. A waterglass solution (185 g of waterglass solution, 24% by weight $SiO_2$, mixed with 207 g of FD water) was then introduced slowly into the suspension and the pH was kept constant at 7.5. This was followed by further stirring for 20 min, and the pH was lowered to 3.0 again and then a solution of 200 ml of $FeCl_3$ (280 g $Fe_2O_3$/l FD water) was metered into the suspension. During this addition, the pH was kept constant at 3.0 by counter-control with 10% strength by weight NaOH solution. This was followed by stirring for 15 min more, by filtration, and by washing of the filtercake with FD water. The filtercake was dried initially at 100° C. and calcined at 750° C. for 30 min. This gave a very brilliant, intense, bronze-colored multilayer pearlescent pigment.

Inventive Example 6

Synthetic Mica/$Fe_2O_3$/$SiO_2$/$TiO_2$ (Rutile)

200 g of synthetic mica from inventive example 2 were suspended in 2000 ml of FD water and heated to 80° C. with turbulent stirring. The pH of the suspension was adjusted to 3.0 using dilute HCl, and then a solution of 60 ml of $FeCl_3$ (280 g $Fe_2O_3$/l FD water) was metered into the suspension. During this addition, the pH was kept constant at 3.0 by counter-control with 10% strength by weight NaOH solution. In order to complete the precipitation, the suspension was stirred for a further 15 min. Thereafter the pH was raised to 7.5 using 5% strength by weight NaOH solution, followed by stirring for 15 min. A waterglass solution (185 g of waterglass solution, 24% by weight $SiO_2$, mixed with 207 g of FD water) was then introduced slowly into the suspension and the pH was kept constant at 7.5. This was followed by stirring for 20 min more, and the pH was lowered again to 1.9. Then a layer of "$SnO_2$" was deposited on the $SiO_2$ surface. This layer was formed by addition of a solution consisting of 5 g of $SnCl_4 \times 5 H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further min. Thereafter the pH was lowered to 1.6 using dilute HCl, and then a solution of 280 ml of $TiCl_4$ (200 g $TiO_2$/l FD water) was metered into the suspension. During this addition, the pH was kept constant at 1.6 by counter-control with 10% strength by weight NaOH solution. This was followed by a further 15 min of stirring, by filtration, and by washing of the filtercake with FD water. The filtercake was initially dried at 100° C. and calcined at 750° C. for 30 min. This gave a very brilliant, intense, bronze-coloured multilayer pearlescent pigment.

Comparative Example 8

Synthetic Mica/Fe$_2$O$_3$/SiO$_2$/Fe$_2$O$_3$ 200 g of synthetic mica from comparative example 2 were suspended in 2000 ml of FD water and heated to 80° C. with turbulent stirring. The pH of the suspension was adjusted to 3.0 using dilute HCl, and then a solution of 37.5 ml of FeCl$_3$ (280 g Fe$_2$O$_3$/l FD water) was metered into the suspension. During the addition, the pH was kept constant at 3.0 by counter-control with 10% strength by weight NaOH solution. In order to complete the precipitation, the suspension was stirred for a further 15 min. Thereafter the pH was raised to 7.5 using 5% strength by weight NaOH solution, and stirring was carried out for 15 min. A waterglass solution (153 g of waterglass solution, 20% by weight SiO$_2$, mixed with 207 g of FD water) was then introduced slowly into the suspension and the pH was kept constant at 7.5. This was followed by further stirring for 20 min, and the pH was lowered to 3.0 again, and then a solution of 120 ml of FeCl$_3$ (280 g Fe$_2$O$_3$/l FD water) was metered into the suspension. During this addition, the pH was kept constant at 3.0 by counter-control with 10% strength by weight NaOH solution. This was followed by stirring for 15 min more, by filtration, and by washing of the filtercake with FD water. The filtercake was dried initially at 100° C. and calcined at 750° C. for 30 min. This gave a weakly lustrous, bronze-colored multilayer pearlescent pigment.

Comparative Example 9

Synthetic Mica/Fe$_2$O$_3$/SiO$_2$/TiO$_2$ (Rutile)

200 g of synthetic mica from comparative example 2 were suspended in 2000 ml of FD water and heated to 80° C. with turbulent stirring. The pH of the suspension was adjusted to 3.0 using dilute HCl, and then a solution of 37.5 ml of FeCl$_3$ (280 g Fe$_2$O$_3$/l FD water) was metered into the suspension. During this addition, the pH was kept constant at 3.0 by counter-control with 10% strength by weight NaOH solution. In order to complete the precipitation, the suspension was stirred for a further 15 min. Thereafter the pH was raised to 7.5 using 5% strength by weight NaOH solution, followed by stirring for 15 min. A waterglass solution (153 g of waterglass solution, 20% by weight SiO$_2$, mixed with 207 g of FD water) was then introduced slowly into the suspension and the pH was kept constant at 7.5. This was followed by stirring for 20 min more, and the pH was lowered again to 1.9. Then a layer of "SnO$_2$" was deposited on the SiO$_2$ surface. This layer was formed by addition of a solution consisting of 5 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further min. Thereafter the pH was lowered to 1.6 using dilute HCl, and then a solution of 300 ml of TiCl$_4$ (200 g TiO$_2$/l FD water) was metered into the suspension. During this addition, the pH was kept constant at 1.6 by counter-control with 10% strength by weight NaOH solution. This was followed by a further 15 min of stirring, by filtration, and by washing of the filtercake with FD water. The filtercake was initially dried at 100° C. and calcined at 750° C. for 30 min. This gave a weakly lustrous, bronze-colored multilayer pearlescent pigment.

II Physical Characterization

IIa Angle-Dependent Color Measurements

For the measurement of the chroma values, the multilayer pearlescent pigments were incorporated by stirring, with a level of pigmentation of 6% by weight (based on the total weight of the wet varnish), into a conventional nitrocellulose varnish (Dr. Renger Erco Bronzemischlack 2615e; from Morton). The multilayer pearlescent pigments were introduced first and then dispersed into the varnish using a brush.

The completed varnish was applied on a drawdown apparatus (RK Print Coat Instr. Ltd. Citenco K 101), with a wet film thickness, depending on D$_{50}$ value of the multilayer pearlescent pigment, in accordance with table 2, onto Byk-Gardner black/white drawdown charts (Byko-Chart 2853), and subsequently dried at room temperature.

Using the multi-angle colorimeter Byk Mac (from Byk Gardener), with a constant incident angle of 45° (in accordance with manufacturer specifications), the L* and C* values were determined at different angles of observation relative to the specular angle. Particularly relevant were the observation angles relatively close to the specular angle, at 15° and −15°. The relevant chroma value of the multilayer pearlescent pigments of the invention was taken to be the C*$_{15}$ value, which was measured at an angle removed by 15° from the specular.

Strongly reflecting samples (ideal mirror case) reflected virtually the entire incident light at the so-called specular angle. Here, the color of the interference color appeared most strongly. The further from the specular angle in the course of measurement, the less light and hence interference effect it was possible to measure.

IIb Gloss Measurements

The gloss is a measure of the directed reflection and can be characterized using a Micro-Tri-Gloss instrument. More strongly scattering samples therefore exhibit a low gloss.

The nitro varnish applications from IIa were subjected to measurement using a Micro-Tri-Gloss gloss meter from Byk Gardner at a measurement angle of 20° for high-gloss samples and at 60° for medium-gloss samples, on a black background. Where the gloss values at 60° were above 70 gloss units, the samples are measured at 20° (Byk-Gardner catalogue 2007/2008, p. 14).

IIc Particle Size Determination:

The size distribution curve was determined using an instrument from Malvern (instrument: Malvern Mastersizer 2000) in accordance with manufacturer indications. For this purpose, about 0.1 g of the pigment in question was placed in the form of an aqueous suspension, without addition of dispersing assistants, and with continual stirring with a Pasteur pipette, into the sample preparation cell of the measuring instrument, and subjected to repeated measurement. From the individual measurement results, the resultant averages were formed. The scattered light signals in this case were evaluated in accordance with the theory of Mie, which also includes refraction and absorption behavior of the particles (FIG. 1).

The average size D$_{50}$ refers in the context of this invention to the D$_{50}$ value of the cumulative undersize curve of the volume-averaged size distribution function, as obtained by laser diffraction methods. The D$_{50}$ value indicates that 50% of the pigments have a diameter which is the same as or smaller than the stated value, for example 20 μm.

Accordingly, the D$_{90}$ value indicates that 90% of the pigments have a diameter which is the same as or smaller than the value in question.

Additionally, the $D_{10}$ value indicates that 10% of the pigments have a diameter which is the same as or smaller than the value in question.

The span $\Delta D$, defined as $\Delta D=(D_{90}-D_{10})/D_{50}$, gives the breadth of the distribution.

III Results

TABLE 3

Characterization of the effect pigments

| Effect pigment | Construction | Gloss, 20° | $C^*_{15}$ | Span |
|---|---|---|---|---|
| Comparative example 3 | Glass flake/Fe$_2$O$_3$ | 62.9 | 4.1 | 1.1 |
| Comparative example 4 | Glass flake/Fe$_2$O$_3$ | 46.7 | 4.0 | 2.0 |
| Inventive example 3 | Glass flake/Fe$_2$O$_3$/SiO$_2$/Fe$_2$O$_3$ | 79.4 | 31.5 | 1.1 |
| Inventive example 4 | Glass flake/Fe$_2$O$_3$/SiO$_2$/TiO$_2$ | 82.5 | 27.7 | 1.1 |
| Comparative example 6 | Glass flake/Fe$_2$O$_3$/SiO$_2$/Fe$_2$O$_3$ | 49.4 | 22.7 | 2.0 |
| Comparative example 7 | Glass flake/Fe$_2$O$_3$/SiO$_2$/TiO$_2$ | 50.9 | 20.4 | 2.0 |

From the data in table 3 it can clearly be seen that the inventive examples 3 and 4, with the layer construction glass flake/Fe$_2$O$_3$/SiO$_2$/Fe$_2$O$_3$ and glass flake/Fe$_2$O$_3$/SiO$_2$/TiO$_2$, respectively, and a low span, had a strong gloss gain of 16.5 units and 19.6 units, respectively, in comparison with the starting material (comparative example 3). For the comparative examples 6 and 7, with a large span, only a slightly increased gloss value was found in comparison with the starting material, comparative example 4. The chroma of the inventive examples 3 and 4 is also shown to be significantly increased compared to the comparative examples 6 and 7 with a broad span.

TABLE 4

Characterization of the effect pigments

| Effect pigment | Construction | Gloss, 60° | $C^*_{15}$ | Span |
|---|---|---|---|---|
| Inventive example 5 | synth. mica/Fe$_2$O$_3$/SiO$_2$/Fe$_2$O$_3$ | 59.2 | 33.6 | 1.2 |
| Inventive example 6 | synth. mica/Fe$_2$O$_3$/SiO$_2$/TiO$_2$ | 57.2 | 25.3 | 1.2 |
| Comparative example 5 | synth. mica/Fe$_2$O$_3$ | 26.4 | 22.3 | 1.2 |
| Comparative example 8 | synth. mica/Fe$_2$O$_3$/SiO$_2$/Fe$_2$O$_3$ | 29.3 | 26.5 | 3.7 |
| Comparative example 9 | synth. mica/Fe$_2$O$_3$/SiO$_2$/TiO$_2$ | 23.9 | 18.8 | 3.7 |

With the mica-based inventive examples 5 and 6 as well, according to table 4, an extreme gloss increase effect, particularly in relation to the comparative examples 8 and 9 (same layer construction) with broad span, is observed. Also apparent here, furthermore, is an additional gloss increase arising from the multilayer technology in comparison of inventive example 5 and 6 with comparative example 5.

IV. Performance Examples

In the cosmetic application examples below, the inventive multilayer pearlescent pigments produced by one of the above examples were used.

Example 7

Nail Varnish

| INCI name | Product name | wt % | Supplier |
|---|---|---|---|
| Phase A | | 100.00 | |
| Multilayer pearlescent pigment | Multilayer pearlescent pigment | 2.00 | |
| Phase B | | | |
| Butyl acetate (and) ethyl acetate (and) nitrocellulose (and) isopropyl alcohol | International Lacquers Nailpolish & Care Base 359 | 98.00 | www.internationallacquers.lu |

The multilayer pearlescent pigment can be used in a range from 0.1%-10.0% by weight. The balance can be made up with International Lacquers Nailpolish.

Phase A and phase B were mixed and then dispensed into an appropriate container.

Example 8

Cream Eyeshadow

| INCI name | Product name | wt % | Supplier |
|---|---|---|---|
| Phase A | | 100.00 | |
| Castor oil | Castor oil | 28.70 | www.riedeldehaen.com |
| Octyl palmitate | Liponate EHP | 6.00 | www.lipochemicals.com |
| *Cocos Nucifera* (coconut) oil | Lipovol C-76 | 7.00 | www.lipochemicals.com |
| Beeswax | Ewacera 12 | 6.00 | www.wagnerlanolin.com |
| Isopropyl lanolate | Ewalan IP | 5.00 | www.wagnerlanolin.com |
| *Persea gratissima* (avocado) oil and hydrogenated avocado oil | Avocado butter | 7.00 | www.impag.de |
| Magnesium stearate | Magnesium stearate | 3.00 | www.sigmaaldrich.com |
| Bis-hydroxyethoxy-propyl dimethicone | Dow Corning 5562 carbinol fluid | 7.00 | www.dowcorning.com |
| Dimethicone/vinyl dimethicone crosspolymer and silica | Dow Corning 9701 cosmetic powder | 5.00 | www.dowcorning.com |
| Phenoxyethanol (and) methylparaben (and) ethylparaben (and) butylparaben | Uniphen P-23 | 0.30 | www.induchem.com |
| Phase B | | | |
| Multilayer pearlescent pigment | Multilayer pearlescent pigment | 25.00 | |

The multilayer pearlescent pigment can be used in a range from 5.0%-30% by weight. The balance can be made up with castor oil.

Phase A was mixed and heated to 85° C., the ingredients of phase B were likewise mixed together, and then were added to phase A with stirring. After being dispensed into an appropriate container, the mixture was cooled to room temperature.

Example 9

Foundation

| INCI name | Product name | wt % | Supplier |
|---|---|---|---|
| Phase A | | 100.00 | |
| Hydrogenated polydecene | Ritadecene 20 | 9.00 | www.ritacorp.com |
| Caprylic/Capric triglyceride | Liponate GC-K | 5.00 | www.lipochemicals.com |
| *Prunus Amygdalus Dulcis* (sweet almond) oil | Sweet almond oil | 4.00 | www.jandekker.com |
| Caprylyl trimethicone | SilCare Silicone 31M50 | 4.00 | www.clariant.com |
| Caprylyl methicone | SilCare silicone 41M15 | 3.00 | www.clariant.com |
| Steareth-2 | Volpo S2 | 1.60 | www.croda.com |
| Steareth-20 | Sympatens AS/200 G | 2.40 | www.kolb.ch |
| Phase B | | | |
| Talc | Talc powder | 4.50 | www.vwr.com |
| Mica (and) iron oxides | Prestige soft beige | 4.00 | |
| Mica (and) titanium dioxide | Prestige soft silver | 1.00 | www.eckart.net |
| Multilayer pearlescent pigment | Multilayer pearlescent pigment | 2.00 | |
| Phase C | | | |
| Glycerin | Pricerine 9090 | 5.00 | www.brenntag.com |
| Aqua | Water | 53.70 | |
| Ammonium acryloyl-dimethyltaurate/VP copolymer | Aristoflex AVC | 0.40 | www.simon-und-werner.com |
| Phase D | | | |
| Propylene glycol (and) diazolidinyl urea (and) methylparaben (and) propylparaben | Nipaguard PDU | 0.40 | www.simon-und-werner.com |

The multilayer pearlescent pigment can be used in a range from 0.1%-8.0% by weight. The balance can be made up with water.

Phase A and phase B were weighed out separately. Phase A was heated to 70° C. with stirring, and phase B was added with stirring. Phase C was mixed thoroughly until the Aristoflex had dissolved, and then was likewise heated to 70° C. Phase C was added to phase AB and, after cooling to 40° C., phase D was added.

Example 10

Pressed Eye Shadow

| INCI Name | Product name | % by wt. | Supplier |
|---|---|---|---|
| Phase A | | 100.00 | |
| Mica | Silk Mica | 17.00 | www.vwr.com |
| Boron nitride | Softouch CCS 102 | 2.50 | www.advceramicscos.com |
| Zinc stearate | Kemilub EZ-V | 7.00 | www.undesa.com |
| Talc | Talc Powder | 38.50 | www.riedeldehaen.com |
| Multilayer pearlescent pigment | Multilayer pearlescent pigment | 25.00 | |
| Phase B | | | |
| Dimethicone | Dow Corning 200 Fluid 5 cst. | 5.00 | www.dowcorning.com |
| Cyclomethicone (and) dimethicone crosspolymer | Dow Corning 9040 Elastomer | 5.00 | www.dowcorning.com |

The multilayer pearlescent pigment can be used in a range of 5.0%-40.0% by weight. The balance can be made up with talc.

Phase A was mixed in a high-speed mixer at 2500 rpm for 30s. Then phase B was added and the mixture was mixed in the same mixer at 3000 rpm for 60 s. Lastly the powder mixture was shaped by pressing in an eye shadow press at 150 bar for 30 s.

Example 11

Hair Mascara

| INCI name | Product name | wt % | Supplier |
|---|---|---|---|
| Phase A | | 100.00 | |
| Polyquaternium-16 | Luviquat FC 905 (Luviquat Excellence) | 2.70 | www.basf.com |
| Propylene glycol | 1,2-propanediol | 1.80 | www.vwr.com |
| Methylparaben | Methyl-4-hydroxybenzoate | 0.20 | www.sigmaaldrich.com |
| Aqua | Water | 64.45 | |
| Phase B | | | |
| Cetearyl alcohol | Lanette O | 5.00 | www.cognis.com |
| Dimethicone | Dow Corning 200 fluid/350 cst | 1.00 | www.dowcorning.com |
| Ceteareth-25 | Cremophor A 25 | 2.00 | www.basf.com |
| Propylparaben | Propyl-4-hydroxybenzoate | 0.10 | www.sigmaaldrich.com |
| Phase C | | | |
| Hydroxy-propylcellulose | Klucel G | 0.50 | www.herc.com |

-continued

| INCI name | Product name | wt % | Supplier |
|---|---|---|---|
| Magnesium aluminium silicate | Veegum HV | 0.50 | www.rtvanderbilt.com |
| Aqua | Water | 19.00 | |
| Phase D | | | |
| Multilayer pearlescent pigment | Multilayer pearlescent pigment | 2.00 | |
| Phenoxyethanol (and) methylparaben (and) butylparaben (and) ethylparaben (and) propylparaben (and) isobutylparaben | Phenonip | 0.20 | www.clariant.com |
| Fragrance | Blue shadow ÖKO | 0.05 | www.bell-europe.com |

The multilayer pearlescent pigment can be used in a range from 0.5%-5.0% by weight. The balance can be made up with water of phase A.

Phase A and phase B were heated separately to 80° C., and then phase B was added slowly to phase A. In a separate vessel, Klucel and Veegum were added to the water of phase C. Then phase AB was cooled to 40° C. and, in the course of cooling, phases C and D were mixed in with stirring.

Example 12

Hair Gel

| INCI name | Product name | wt % | Supplier |
|---|---|---|---|
| Phase A | | 100.00 | |
| Multilayer pearlescent pigment | Multilayer pearlescent pigment | 0.10 | |
| Ammonium acryloyldimethyl-taurate/VP copolymer | Aristoflex AVC | 1.40 | www.clariant.com |
| Citric acid | Citric acid | 0.10 | www.vwr.com |
| Aqua | Water | 55.10 | |
| Phase B | | | |
| PVP | Luviskol K30 powder | 1.50 | www.basf.com |
| Propylene glycol, diazolidinyl, urea, methylparaben, propylparaben | Germaben II | 0.20 | www.ispcorp.com |
| Triethanolamine | Triethanolamine | 1.20 | www.vwr.com |
| Water | Aqua | 40.40 | |

The multilayer pearlescent pigment can be used in a range from 0.01%-0.5% by weight. The balance can be made up with water.

The pigment was stirred together with the water of phase A, Aristoflex AVP and citric acid were added with stirring, and the composition was mixed for 15 minutes at a speed of 800 rpm. The ingredients of phase B were dissolved until a homogeneous solution was produced, and then phase B was added to phase A, and the composition was mixed.

What is claimed is:

1. Multilayer pearlescent pigments, comprising platelet-shaped transparent substrates provided with an optically active coating, wherein the optically active coating comprises at least
   (a) an absorbing high-index layer A having a refractive index $n \geq 1.8$
   (b) a low-index layer B having a refractive index $n < 1.8$
   (c) a high-index layer C having a refractive index $n \geq 1.8$ and also
   d) optionally at least one outer protective layer D and
   in that the multilayer pearlescent pigments have a cumulative frequency distribution of a volume-averaged size distribution function, with the indices $D_{10}$, $D_{50}$, $D_{90}$ and a span $\Delta D$ in a range from 0.7-1.4, the span $\Delta D$ being calculated in accordance with formula (I)

$$\Delta D = (D_{90} - D_{10})/D_{50}, \quad (I),$$

wherein said multilayer pearlescent pigments have chroma values $C^*_{15} > 20$.

2. The multilayer pearlescent pigments of claim 1, wherein the multilayer pearlescent pigments have no silver interference color.

3. The multilayer pearlescent pigments of claim 1, wherein the multilayer pearlescent pigments have a span $\Delta D$ in a range from 0.7-1.3.

4. The multilayer pearlescent pigments of claim 1, wherein an optical layer thickness of layer A is in a range from 30 to 900 nm.

5. The multilayer pearlescent pigments of claim 1, wherein an optical layer thickness of layer B is in a range from 30 to $\leq 500$ nm.

6. The multilayer pearlescent pigments of claim 1, wherein an optical layer thickness of layer B is in a range from 30 to 150 nm.

7. The multilayer pearlescent pigments of claim 1, wherein an optical layer thickness of layer C is in a range from 30 to 900 nm.

8. The multilayer pearlescent pigments of claim 1, wherein layers A and C comprise a titanium oxide.

9. The multilayer pearlescent pigments of claim 1, wherein layer B comprises a silicon oxide.

10. The multilayer pearlescent pigments of claim 1, wherein the platelet-shaped substrates are selected from the group consisting of natural mica, synthetic mica, glass flakes, $SiO_2$ platelets, $Al_2O_3$ platelets, and mixtures thereof.

11. A method for producing the multilayer pearlescent pigments of claim 1, wherein the method comprises the following steps:
   (i) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with formula (I), and
   (ii) applying at least the layers A to C to the platelet-shaped transparent substrates, and also, optionally, at least one layer D, or
   (iii) applying at least the layers A to C to the platelet-shaped transparent substrates, and also, optionally, at least one layer D, and
   (iv) size-classifying the platelet-shaped transparent substrates to be coated, so that the platelet-shaped transparent substrates to be coated have a volume-averaged size distribution function with the characteristics $D_{10}$, $D_{50}$ $D_{90}$, and a span $\Delta D$ in a range of 0.7-1.4, the span $\Delta D$ being defined in accordance with formula (I).

12. An article wherein the article comprises the multilayer pearlescent pigments of claim 1.

13. A preparation wherein the preparation comprises the multilayer pearlescent pigments of claim 1.

14. The multilayer pearlescent pigments of claim 8, wherein the titanium oxide is titanium dioxide.

15. The multilayer pearlescent pigments of claim 9, wherein the silicon oxide is silicon dioxide.

16. The multilayer pearlescent pigments of claim 1, wherein the absorbing high-index layer A comprises iron oxide and the high-index layer C comprises a metal oxide selected from the group consisting of titanium dioxide, iron oxide and mixtures thereof.

* * * * *